(12) United States Patent
Ido et al.

(10) Patent No.: US 8,260,855 B2
(45) Date of Patent: Sep. 4, 2012

(54) TRAIN COMMUNICATION SYSTEM, COMMUNICATION DEVICE AND RELAY DEVICE

(75) Inventors: Joji Ido, Tokyo (JP); Shogo Tatsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 242 days.

(21) Appl. No.: 12/674,693

(22) PCT Filed: Nov. 27, 2008

(86) PCT No.: PCT/JP2008/003500
§ 371 (c)(1),
(2), (4) Date: Feb. 23, 2010

(87) PCT Pub. No.: WO2009/075068
PCT Pub. Date: Jun. 18, 2009

(65) Prior Publication Data
US 2011/0113093 A1   May 12, 2011

(30) Foreign Application Priority Data

Dec. 13, 2007   (JP) .................... 2007-322294

(51) Int. Cl.
    *G06F 15/16*   (2006.01)
(52) U.S. Cl. ........................ 709/204; 709/203
(58) Field of Classification Search .............. 709/203, 709/204
    See application file for complete search history.

(56) References Cited

U.S. PATENT DOCUMENTS
7,352,735 B1 * 4/2008 Hayashi .................. 370/348

FOREIGN PATENT DOCUMENTS

| | | |
|---|---|---|
| DE | 10 2004 030 561 A1 | 4/2005 |
| JP | 59 123401 | 7/1984 |
| JP | 64 85505 | 3/1989 |
| JP | 2-137545 A | 5/1990 |
| JP | 4 345339 | 12/1992 |
| JP | 2559079 | 12/1992 |
| JP | 7 46881 | 2/1995 |
| JP | 11 331171 | 11/1999 |
| JP | 2001-257717 A | 9/2001 |
| JP | 2005 333724 | 12/2005 |
| JP | 2006 80994 | 3/2006 |
| JP | 2006 254492 | 9/2006 |
| KR | 10-2006-0131859 | 12/2006 |

OTHER PUBLICATIONS

Singaporean Search Report and Written Opinion issued Aug. 10, 2010 in corresponding Singaporean Application No. 201003351-2 filed Nov. 27, 2008.
Korean Office Action issued Apr. 12, 2011, in Patent Application No. 10-2010-7006038 (with English-language translation).

* cited by examiner

*Primary Examiner* — Adnan Mirza
(74) *Attorney, Agent, or Firm* — Oblon, Spivak, McClelland, Maier & Neustadt, L.L.P.

(57) ABSTRACT

Relay devices 1 and vehicle monitoring control devices 2 include communication cycle management sections 111 and 211 for managing communication cycles in accordance with cycle information that divides the communication cycle to communication enabled periods which include a period of enabling only communication of a message to be communicated periodically and correspond to a communication period of a message; and carry out communication in the communication cycles managed by the communication cycle management sections 111 and 211.

12 Claims, 20 Drawing Sheets

| Message Identifier | Transmission Source Identifier | Cycle Length | Aperiodic Communication Disabled Duration | Aperiodic Communication Enabled Duration |
|---|---|---|---|---|

FIG.11

| Message Identifier | Transmission Source Identifier | Transmission Control Station Change Flag | Cycle Length | Aperiodic Communication Disabled Duration | Aperiodic Communication Enabled Duration |
|---|---|---|---|---|---|

TRAIN COMMUNICATION SYSTEM, COMMUNICATION DEVICE AND RELAY DEVICE

TECHNICAL FIELD

The present invention relates to a train communication system for communicating via an on-vehicle network of a railroad train, and a communication device and a relay device constituting it.

BACKGROUND ART

In a railroad train, vehicle monitoring control devices are distributed to individual vehicles, and vehicle equipment undergoes monitoring and control of the vehicle monitoring control devices. In addition, a relay device is placed for each set of vehicles. The on-vehicle network of the railroad train is configured by establishing communication connections between the relay devices, and between the relay devices and the vehicle monitoring control devices. By enabling the vehicle monitoring control devices to share monitoring control data on each other via the on-vehicle network, it becomes possible to achieve sophisticated running control or fault diagnostic function.

As for communications between the vehicle monitoring control devices, there are those that require real time quality and occur periodically such as transferring command values to various devices and referring to state values of the devices. In addition, there are those that do not require real time quality or do not occur periodically such as downloading a fault diagnostic result or event log. Here, if the former communication that requires real time quality occurs during the latter communication that does not require real time quality, the latter communication can damage the real time quality of the former communication.

A hindrance in the communication between the vehicle monitoring control devices that require real time quality can have a great influence on the running control of the train. In view of this, Patent Document 1, for example, discloses a prior art that carries out communication that does not require real time quality simultaneously while maintaining the real time quality of the communication that exchanges monitoring control data and the like on the on-vehicle network of the railroad train.

In Patent Document 1, a message is provided with priority information in accordance with the degree of a request for the real time quality. For example, a high priority is given to a message that requires real time quality, and a low priority to a message that does not require real time quality. In addition, the relay devices have priority-specific queues.

In the relay devices, messages received via the on-vehicle network are distributed to the priority-specific queues in accordance with the priority information. The relay devices pick out and relay a message in a high priority queue preferentially, and only when there is no message in the high priority queue, they pick out and relay a message in a low priority queue.

Patent Document 1: Japanese Patent Laid-Open No. 2005-333724 (see Paragraphs 0018-0027 and FIG. 4 and FIG. 6).

Conventionally, trouble occurs when an aperiodic message that does not require real time quality is transmitted right before a periodic message that requires real time quality. In this case, in a relay device, at a time when it stores the message that requires real time quality in the high priority queue, it has already picked out the message that does not require real time quality from the low priority queue and has started relaying. Accordingly, the relay device cannot relay any other message until completing relaying the message that does not require real time quality. This offers a problem of delaying relaying the message that requires real time quality, thereby impairing the real time quality.

The present invention is implemented to solve the foregoing problems. Therefore it is an object of the present invention to provide a train communication system capable of maintaining the real time quality of a message to be communicated periodically in spite of the communication of a message enabled to undergo aperiodic communication, and to provide a communication device and relay device constituting the train communication system.

DISCLOSURE OF THE INVENTION

A train communication system in accordance with the present invention has a communication device mounted on each vehicle, the communication device: comprising a communication cycle management section for managing communication cycles in accordance with cycle information that divides the communication cycle to a period enabling communication of only a message to be communicated periodically, to a period enabling communication of a message allowed aperiodic communication, and to an idle period enabling communication of only a cycle start message and a message in course of communication; and carrying out communication in the communication cycles managed by the communication cycle management section.

According to the present invention, since it carries out communication by dividing the communication cycle into communication enabled periods which include a period enabling only the communication of a message to be communicated periodically and correspond to the communication period of a message, it offers an advantage of being able to eliminate the conditions in which a message that is allowed aperiodic communication can impair the real time quality of the message to be communicated periodically.

BRIEF DESCRIPTION OF THE DRAWINGS

FIG. 11 is a diagram showing a structure of a cycle start message in the embodiment 2;

BEST MODE FOR CARRYING OUT THE INVENTION

The best mode for carrying out the invention will now be described with reference to the accompanying drawings to explain the present invention in more detail.

Embodiment 1

Figure 1:
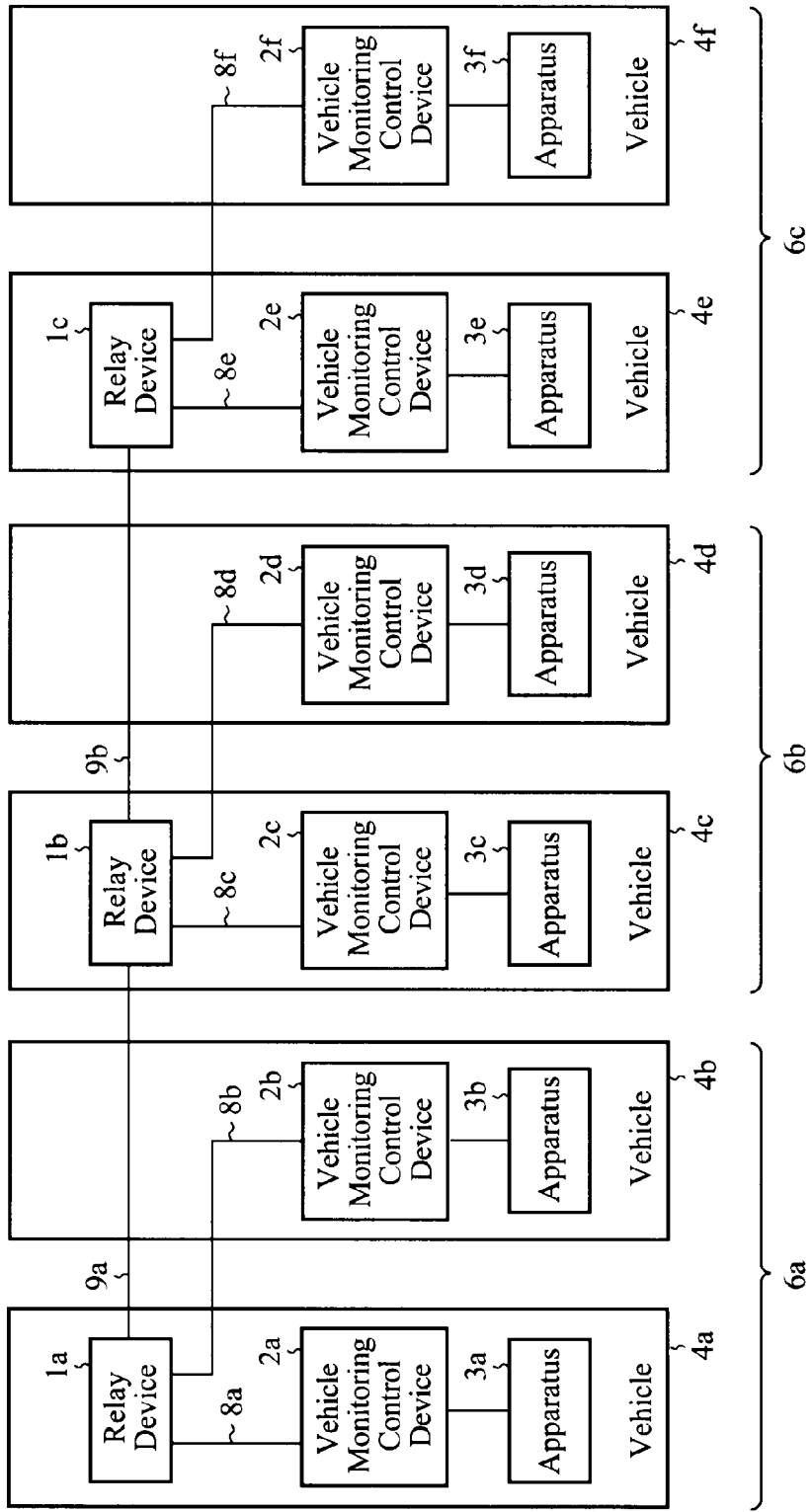
FIG. 1 is a block diagram showing a configuration of a train communication system of an embodiment 1 in accordance with the present invention.

FIG. 1 is a block diagram showing a configuration of a train communication system of an embodiment 1 in accordance with the present invention. In FIG. 1, an explanation will be made by way of example of a railroad train including individual vehicles 4a-4f making up sets 6a-6c in units of two. The train communication system of the embodiment 1 has relay devices 1a-1c and vehicle monitoring control devices (communication devices) 2a-2f. The relay devices 1a-1c are mounted on the sets 6a-6c to relay communications between the individual vehicle monitoring control devices 2a-2f via the on-vehicle network. The vehicle monitoring control devices 2a-2f are mounted on the individual vehicles 4a-4f to perform monitoring control of apparatuses 3a-3f. The apparatuses 3a-3f are vehicle equipment mounted on the individual vehicles 4a-4f.

The relay device 1a is connected to the vehicle monitoring control devices 2a and 2b in the set 6a via intra-set transmission lines 8a and 8b. Likewise, the relay device 1b is connected to the vehicle monitoring control devices 2c and 2d in the set 6b via intra-set transmission lines 8c and 8d. The relay device 1c is connected to the vehicle monitoring control devices 2e and 2f in the set 6c via intra-set transmission lines 8e and 8f. Furthermore, the relay devices 1a and 1b are interconnected via an inter-set transmission line 9a, and the relay devices 1b and 1c are interconnected via an inter-set transmission line 9b.

In the train communication system of the embodiment 1, the on-vehicle network is constructed which carries out the information transmission through the intra-set transmission lines 8a-8f and the inter-set transmission lines 9a and 9b. Incidentally, in the example of FIG. 1, the vehicle monitoring control device 2a operates as a transmission control station, and the other vehicle monitoring control devices 2b-2f operate as a transmission subsidiary station.

Figures 2, 3:
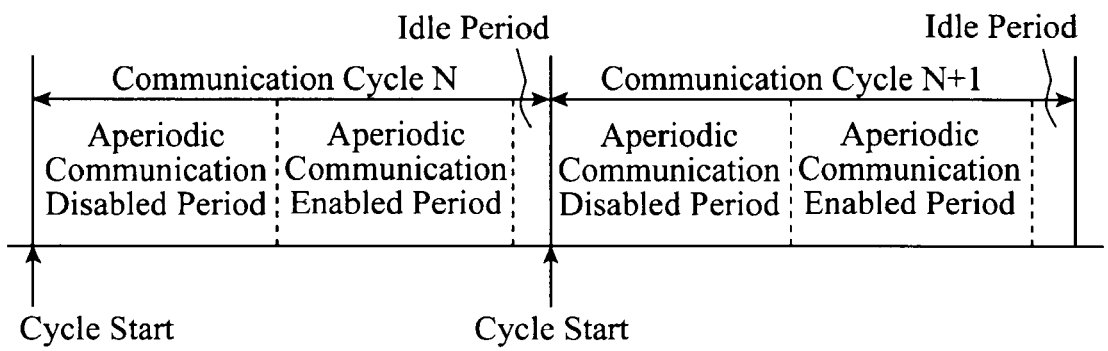
FIG. 2 is a diagram showing communication cycles in the train communication system in FIG. 1.
FIG. 3 is a diagram showing a structure of a cycle start message in the embodiment 1.

Here, the communication of the train communication system of the embodiment 1 via the on-vehicle network will be described. FIG. 2 is a diagram for explaining communication cycles in the train communication system in FIG. 1. The communication cycle is a unit of a communication pattern carried out repeatedly in the communication via the on-vehicle network. FIG. 2 shows a communication cycle N and the next communication cycle N+1.

In the embodiment 1, the communication cycles are specified in accordance with the periodicity of data in order to prevent the real time quality of the communication of periodic data such as that of the monitoring control data from being damaged by other data communication that occurs aperiodically and does not require real time quality. In the example of FIG. 2, an aperiodic communication disabled period, an aperiodic communication enabled period, and an idle period are specified in the communication cycles. In this way, the communication via the on-vehicle network, which is carried out by the relay devices and the vehicle monitoring control devices, makes such state transition as the aperiodic communication disabled state, aperiodic communication enabled state, idle state and aperiodic communication disabled state with time.

In the aperiodic communication disabled period, only communication of a message to be transmitted periodically is enabled, and transmission of a message to be transmitted aperiodically is disabled. In contrast, in the aperiodic communication enabled period, the transmission of a message to be transmitted aperiodically is enabled. Incidentally, in the aperiodic communication enabled period, the transmission of a message to be transmitted periodically may be disabled, but can undergo priority control in accordance with the periodicity of the message without being disabled. For example, a high priority is given to a message to be transmitted periodically and a low priority is given to a message to be transmitted aperiodically, and the communication control in accordance with the priority can be conducted.

The idle period is an extra period provided to complete the reception of the message whose transmission is started in the particular communication cycle N before the start of the next communication cycle N+1. In the idle period, although the start of the message transmission is disabled, the transmission is continued of the message whose transmission has already been started by that time and is being transmitted.

Incidentally, the length of the aperiodic communication disabled period in each communication cycle is set in such a manner that the communication of the periodic messages transmitted from all the vehicle monitoring control devices 2a-2f is completed within the aperiodic communication disabled period. This makes it unnecessary to inhibit the communication of the periodic message in the aperiodic communication enabled period. In the following explanation, it is assumed that the communication of the periodic message is not disabled in the aperiodic communication enabled period.

The vehicle monitoring control device 2a serving as the transmission control station manages the information that specifies the length of the communication cycles, aperiodic communication disabled period and aperiodic communication enabled period. In addition, the vehicle monitoring control device 2a manages the start timing of the communication cycles using a timer. The management information on the communication cycles is collected as a cycle start message by the vehicle monitoring control device 2a.

The vehicle monitoring control device 2a broadcasts the cycle start message to the vehicle monitoring control devices 2b-2f and relay devices 1a-1c, which operate as the transmission subsidiary stations. The relay devices 1a-1c and vehicle monitoring control devices 2b-2f consider the reception of the cycle start message as a start of the communication cycle and carry out the communication specified by the cycle start message.

FIG. 3 is a diagram showing a structure of the cycle start message of the embodiment 1. In FIG. 3, the cycle start message is composed of fields corresponding to a message identifier, transmission source identifier, cycle length, aperiodic communication disabled duration, and aperiodic communication enabled duration, respectively. In the following, information items such as the transmission source identifier, cycle length, aperiodic communication disabled duration, and aperiodic communication enabled duration are referred to as cycle information in general. The relay devices 1a-1c and vehicle monitoring control devices 2b-2f carry out communication via the on-vehicle network in accordance with the cycle information read out of the cycle start message.

Incidentally, the cycle start message may include data other than the foregoing data as the cycle information. For example, when the vehicle monitoring control device 2a serving as the transmission control station is connected to a driver's cab operated by a driver, it is also possible to store the foregoing cycle information in a message header and to store, in the message itself, command data to the vehicle equipment of the individual vehicles.

Figure 4:
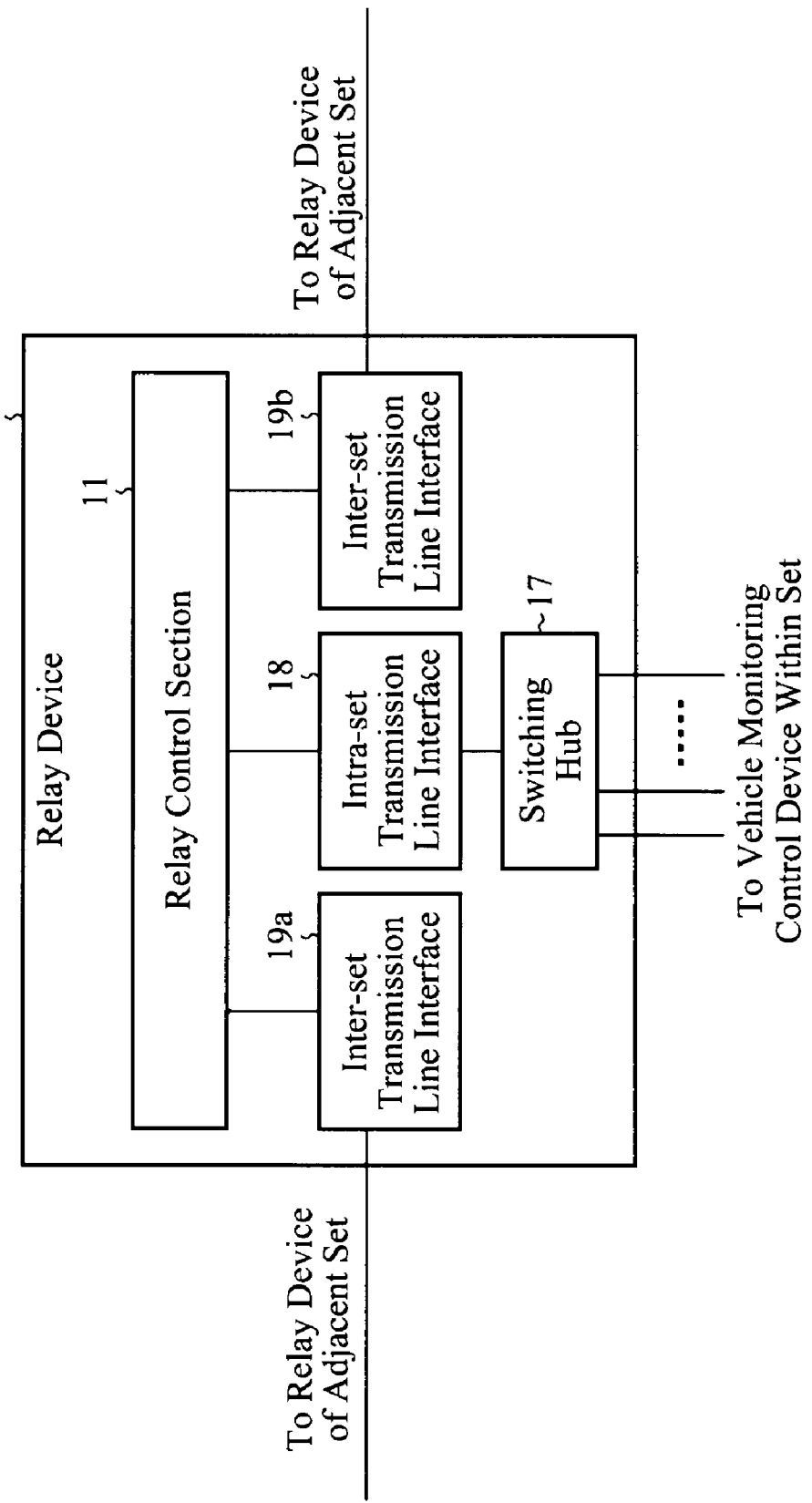
FIG. 4 is a block diagram showing a configuration of a relay device in FIG. 1.

FIG. 4 is a block diagram showing a configuration of a relay device in FIG. 1. The relay devices 1a-1c are referred to as a relay device 1 generically. In FIG. 4, the relay device 1 includes a relay control section 11, a switching hub 17, an intra-set transmission line interface 18, and inter-set transmission line interfaces 19a and 19b. The relay control section 11 is connected to the transmission line interfaces 18, 19a and 19, and relays a message sent via one of the transmission line interfaces to the other transmission line interfaces. For example, it relays a message transmitted via the inter-set transmission line interface 19a to the intra-set transmission line interface 18 and inter-set transmission line interface 19b.

The inter-set transmission line interfaces 19a and 19b are each provided per inter-set transmission line between the relay devices of the sets. For example, the inter-set transmission line interface 19a in the relay device 1b of the set 6b is connected to the inter-set transmission line 9a connected to the relay device 1a of the set 6a, and the inter-set transmission line interface 19b is connected to the inter-set transmission line 9c connected to the relay device 1c of the set 6c. In addition, the intra-set transmission line interface 18 is provided for each relay device 1 and is connected to the switching hub 17.

The switching hub 17 is connected to the vehicle monitoring control devices provided in the individual vehicles in the set via the intra-set transmission lines. For example, the switching hub 17 in the relay device 1a in the set 6a is connected to the intra-set transmission lines 8a and 8b collectively, which are connected to the vehicle monitoring control devices 2a and 2b mounted on the vehicles 4a and 4b, respectively. The communication between the vehicle monitoring control devices in the set is carried out via the switching hub 17 without via the relay control section 11.

Figure 5:
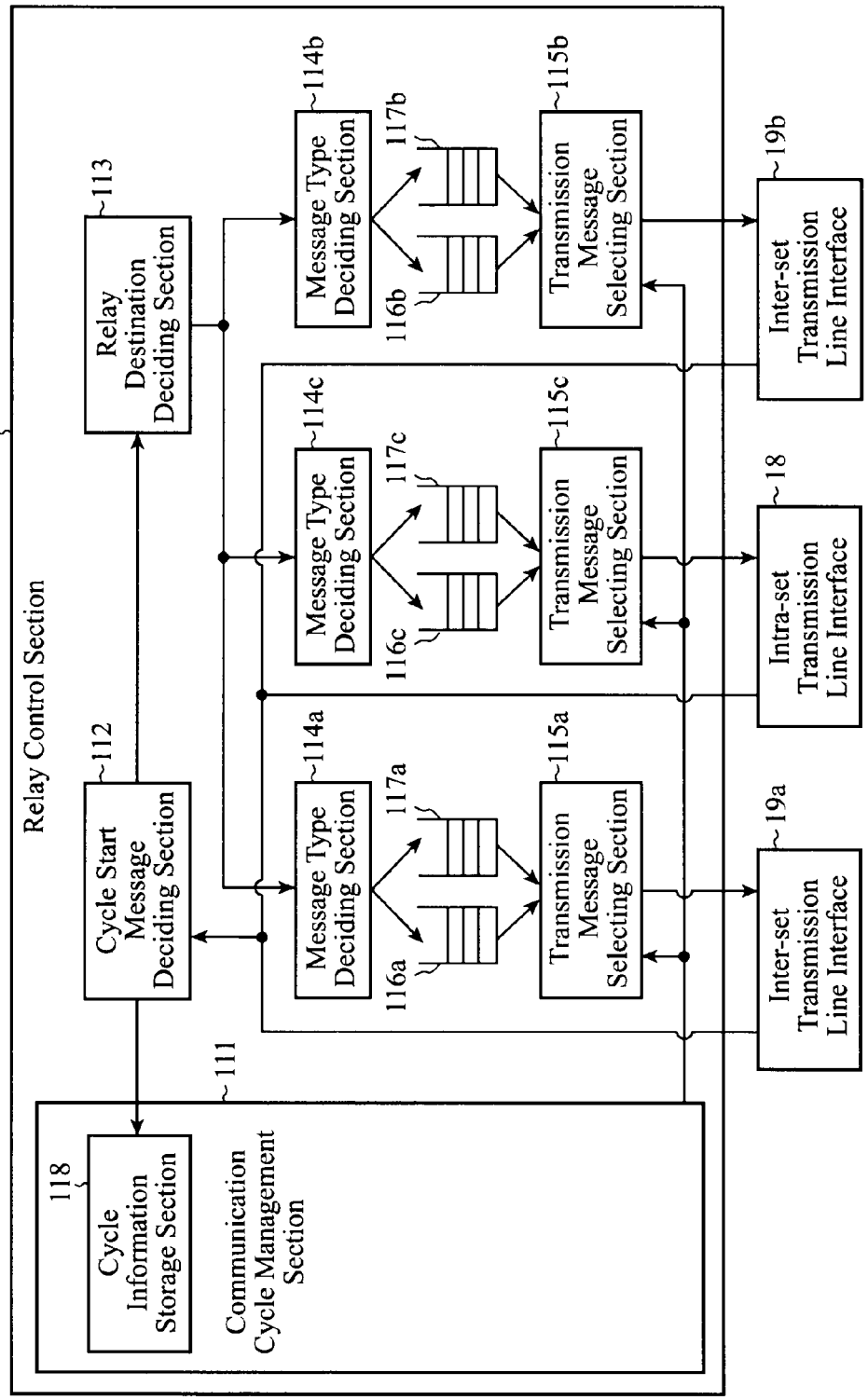
FIG. 5 is a block diagram showing a configuration of a relay control section in FIG. 4.

FIG. 5 is a block diagram showing a configuration of the relay control section in FIG. 4. In FIG. 5, the relay control section 11 includes a communication cycle management section 111, a cycle start message deciding section 112, a relay destination deciding section 113, message type deciding sections 114a-114c, transmission message selecting sections 115a-115c, periodic message queues 116a-116c, and aperiodic message queues 117a-117c. In addition, the communication cycle management section 111 includes a cycle information storage section 118.

The communication cycle management section 111 manages the states (aperiodic communication disabled state, aperiodic communication enabled state, and idle state) of the communication cycle using a timer not shown. For example, when carrying out communication according to the communication cycles shown in FIG. 2, the communication cycle management section 111 starts the timer when it receives the cycle start message and shifts to the aperiodic communication disabled state.

The cycle information storage section 118 stores the cycle information the cycle start message deciding section 112 reads out of the cycle start message. According to the contents of the cycle information read out of the cycle information storage section 118, the communication cycle management section 111 grasps the length of the aperiodic communication disabled period and the length of the aperiodic communication enabled period, and makes a transition of the state of the communication cycle such as from the aperiodic communication disabled state to the aperiodic communication enabled state, and to the idle state with time.

The message received via the intra-set transmission line interface 18 and the inter-set transmission line interfaces 19a and 19b is input to the cycle start message deciding section 112. The cycle start message deciding section 112 makes a decision as to whether the input message is a cycle start message or not. If it makes a decision that the input message is the cycle start message, the cycle start message deciding section 112 reads the cycle information contained in the cycle start message and notifies the communication cycle management section 111 of it. Incidentally, the message passing through the cycle start message deciding section 112 is delivered to the relay destination deciding section 113 regardless of whether it is a cycle start message or not.

The relay destination deciding section 113 reads destination address information from the message supplied from the cycle start message deciding section 112, and distributes the message to one of the message type deciding sections 114a-114c corresponding to the appropriate transmission line interfaces in response to the destination address information.

The message type deciding sections 114a-114c make a decision as to whether the message input via the relay destination deciding section 113 is a message to be transmitted periodically (the message that requires real time quality) or a message to be transmitted aperiodically (the message that does not require real time quality). According to the decision result, the message type deciding sections 114a-114c distribute the messages input via the relay destination deciding section 113 to the periodic message queues 116a-116c or aperiodic message queues 117a-117c.

The transmission message selecting sections 115a-115c receive notification of the current state of the communication cycle from the communication cycle management section 111. Thus, the transmission message selecting sections 115a-115c pick out the message corresponding to the current state of the communication cycle from the periodic message queues 116a-116c or aperiodic message queues 117a-117c, and transmits it via the transmission line interface 18, 19a or 19b.

Figure 6:
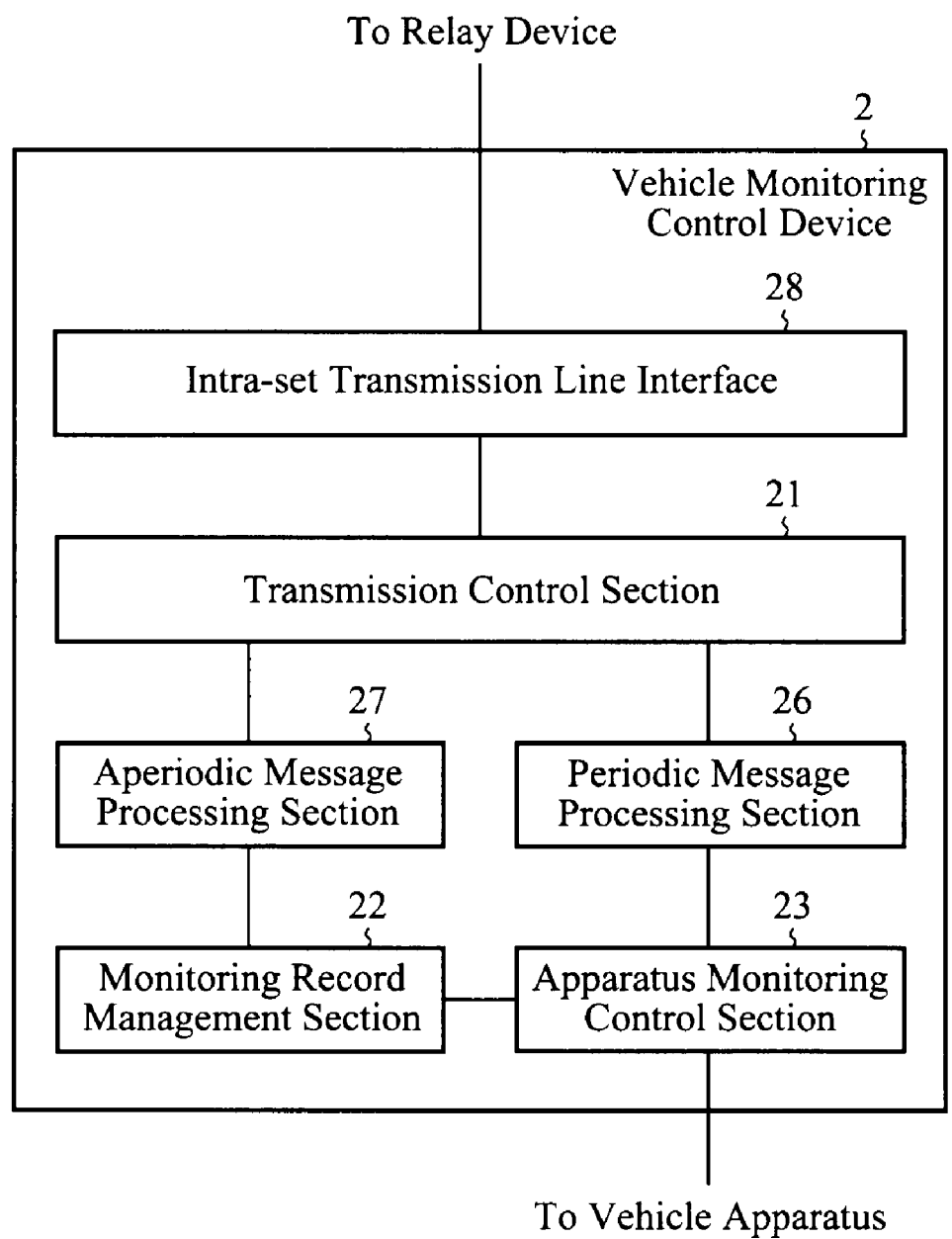
FIG. 6 is a block diagram showing a configuration of a vehicle monitoring control device in FIG. 1.

FIG. 6 is a block diagram showing a configuration of the vehicle monitoring control devices in FIG. 1. The vehicle monitoring control devices 2a-2f are referred to as a vehicle monitoring control device 2 generically. In FIG. 6, the vehicle monitoring control device 2 includes a transmission control section 21, a monitoring record management section 22, an apparatus monitoring control section 23, a periodic message processing section 26, an aperiodic message processing section 27 and an intra-set transmission line interface 28.

The transmission control section 21 acquires the message received via the intra-set transmission line interface 28, and makes a decision of the type of the message (a message to be transmitted periodically or a message to be transmitted aperiodically). According to the message type of the decision result, the transmission control section 21 transmits the message input to the periodic message processing section 26 or to the aperiodic message processing section 27. On the contrary, the transmission control section 21 transmits a message received via the periodic message processing section 26 or aperiodic message processing section 27 to the relay device 1 via the intra-set transmission line interface 28.

The monitoring record management section 22 stores various monitoring results about the vehicle equipment obtained by the apparatus monitoring control section 23 in an internal memory (not shown) as the vehicle monitoring record information and manages them. The apparatus monitoring control section 23 is connected to the vehicle equipment (apparatuses 3a-3f) which is the target of the monitoring control, and carries out the monitoring control of the vehicle equipment.

The periodic message processing section 26 transmits the monitoring control data about the vehicle equipment of its own vehicle obtained by the apparatus monitoring control section 23 to the relay device 1 via the transmission control section 21 and intra-set transmission line interface 28 as a message. In addition, the periodic message processing section 26 picks out the monitoring control data about the vehicle equipment of the other vehicles from the message received via the transmission control section 21, and sets to the apparatus monitoring control section 23. Incidentally, the message for conveying monitoring control related information containing the monitoring control data is created at every prescribed communication period corresponding to the control period.

The aperiodic message processing section 27 transmits the vehicle monitoring record information it reads out of the monitoring record management section 22 to the relay device 1 via the transmission control section 21 and intra-set transmission line interface 28 as a message. In addition, the aperiodic message processing section 27 picks out the vehicle monitoring record information about the vehicle equipment of the other vehicles from the message received via the transmission control section 21, and sets to the monitoring record management section 22. Incidentally, the message for conveying the vehicle monitoring record information is created aperiodically in accordance with commands from a driver's cab (not shown) and the like.

Figure 7:
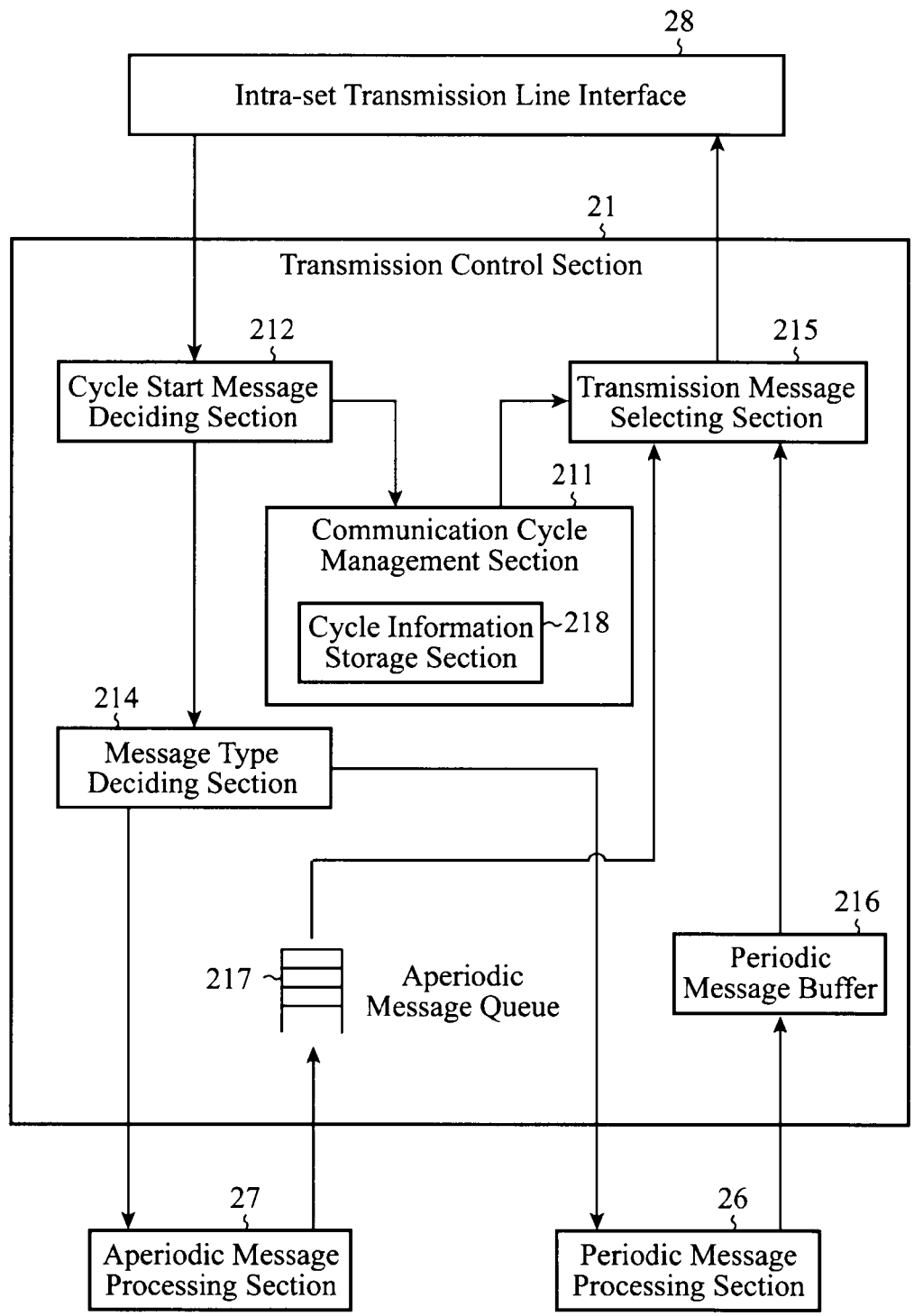
FIG. 7 is a block diagram showing a configuration of a transmission control section in FIG. 6.

FIG. 7 is a block diagram showing a configuration of the transmission control section 21 in FIG. 6 along with the periodic message processing section 26, aperiodic message processing section 27 and intra-set transmission line interface 28, which constitute connection destinations. In FIG. 7, the transmission control section 21 includes a communication cycle management section 211, a cycle start message deciding section 212, a message type deciding section 214, a transmission message selecting section 215, a periodic message buffer 216, and an aperiodic message queue 217. In addition, the communication cycle management section 211 includes a cycle information storage section 218.

The communication cycle management section 211 manages the states (aperiodic communication disabled state, aperiodic communication enabled state, and idle state) of the communication cycle using the timer not shown. The processing of the communication cycle management section 211 varies depending on whether the vehicle monitoring control device 2 is the transmission control station or transmission subsidiary station.

First, the communication cycle management section 211 installed in the vehicle monitoring control device 2 operating as the transmission control station will be described.

The communication cycle management section 211 manages the start timing of the communication cycles using the timer not shown. For example, when carrying out communication according to the communication cycles shown in FIG. 2, the communication cycle management section 211 starts the timer at the starting point of the communication cycles, and shifts to the aperiodic communication disabled state. In this case, the communication cycle management section 211 broadcasts the cycle start message to the vehicle monitoring control devices 2b-2f and relay devices 1a-1c, which operate as the transmission subsidiary stations, via the transmission message selecting section 215 and intra-set transmission line interface 28.

Incidentally, in the cycle information storage section 218, the cycle information is stored in advance. The communication cycle management section 211 reads the cycle information from the cycle information storage section 218, and creates the cycle start message containing the cycle information. Once the communication cycle has been started, the state of the communication cycle makes a transition, according to the contents of the cycle information, from the aperiodic communication disabled state to the aperiodic communication enabled state, and to the idle state with time.

Next, the communication cycle management section 211 installed in the vehicle monitoring control device 2 operating as the transmission subsidiary station will be described.

The communication cycle management section 211 starts the timer at the point of receiving the cycle start message, and shifts to the aperiodic communication disabled state. In the cycle information storage section 218, the cycle information is stored which is read out of the cycle start message by the cycle start message deciding section 212. The communication cycle management section 211 grasps the length of the aperiodic communication disabled period and the length of the aperiodic communication enabled period from the contents of the cycle information read from the cycle information storage section 218, and makes a transition of the state of the communication cycle such as from the aperiodic communication disabled state to the aperiodic communication enabled state, and to the idle state with the time in the periods.

The message received via the intra-set transmission line interface 28 is input to the cycle start message deciding section 212. The cycle start message deciding section 212 makes a decision as to whether the input message is a cycle start message or not. When the input message is the cycle start message, the cycle start message deciding section 212 reads the cycle information contained in the cycle start message, and notifies the communication cycle management section 211. Incidentally, the message passing through the cycle start message deciding section 212 is transmitted to the message type deciding section 214 regardless of whether it is a cycle start message or not.

The message type deciding section 214 makes a decision as to whether the message input via the cycle start message deciding section 212 is a message to be transmitted periodically (the message that requires real time quality) or a message to be transmitted aperiodically (the message that does not require real time quality). According to the decision result, the message type deciding sections 214 distributes the message input via the cycle start message deciding section 212 to the periodic message processing section 26 or to the aperiodic message processing section 27.

The periodic message buffer 216 stores the message created by the periodic message processing section 26. In addition, the aperiodic message queue 217 stores the message created by the aperiodic message processing section 27. The transmission message selecting section 215 picks out a message from the periodic message buffer 216 or from the aperiodic message queue 217 in accordance with the current state of the communication cycle the communication cycle management section 211 manages, and transmits to the relay device 1 via the intra-set transmission line interface 28.

Incidentally, since the creation of the message by the aperiodic message processing section 27 and the transmission of the message by the transmission message selecting section 215 are carried out asynchronously, the aperiodic message queue 217 is provided between them. On the other hand, although the creation of the message by the periodic message processing section 26 and the transmission of the message by the transmission message selecting section 215 are carried out asynchronously as well, only a buffer for storing a single message is provided between them instead of a queue.

The message created by the periodic message processing section 26, which conveys the monitoring control related information generated in accordance with the control period, is a message to be transmitted periodically. In this case, it is more important to discard old information and convey latest information timely rather than to convey all the information including old information losing the real time quality. Thus, the periodic message buffer 216 for storing only a single message is placed after the periodic message processing section 26. Unless it is necessary to consider such characteristics of the message, a queue can be placed after the periodic message processing section 26.

Next, the operation will be described.

Figure 8:
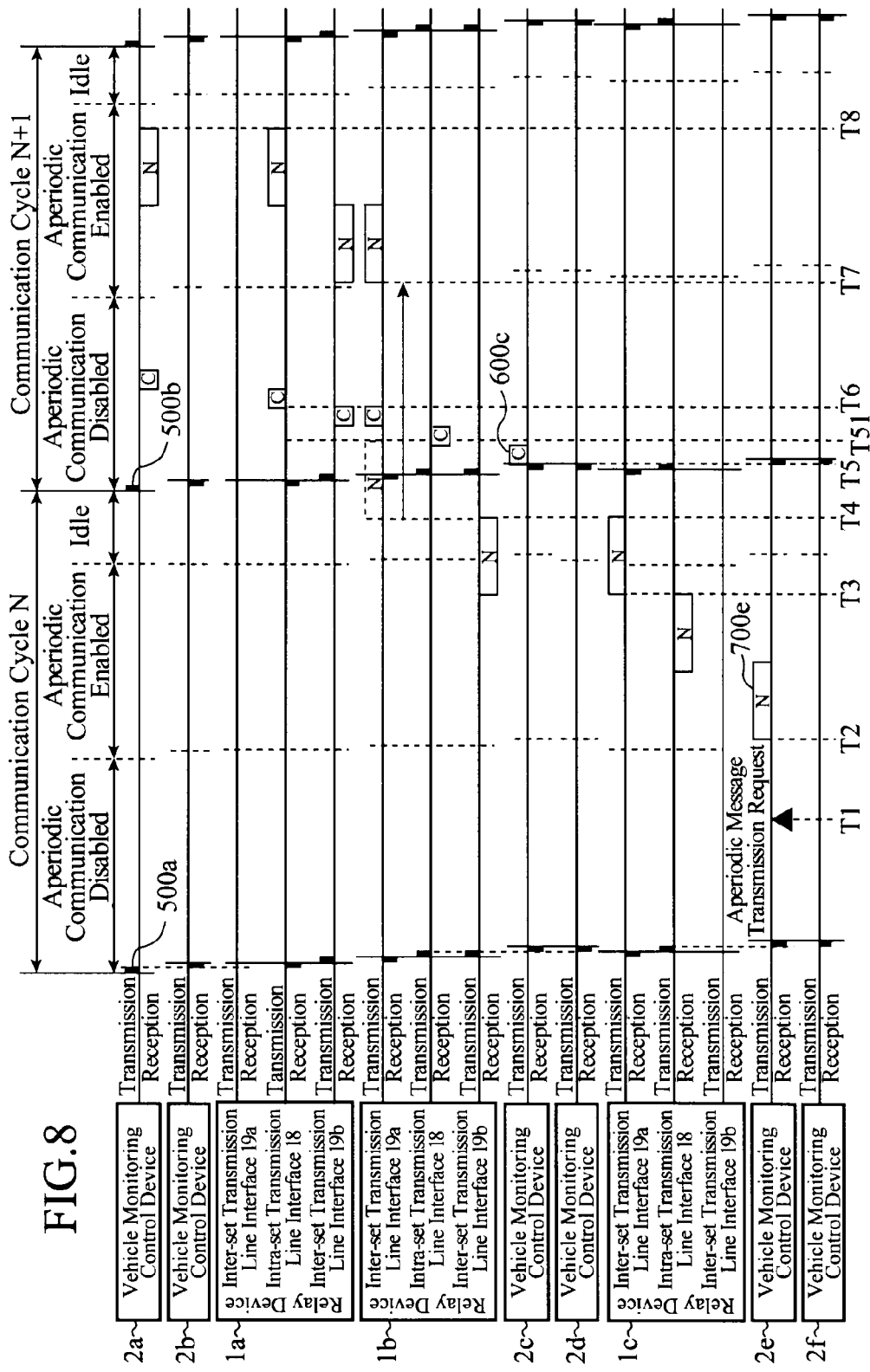
FIG. 8 is a timing chart showing the operation of the train communication system of the embodiment 1.

FIG. 8 is a timing chart showing the operation of the train communication system of the embodiment 1, which shows message transmission and reception states of the relay devices 1a-1c and vehicle monitoring control devices 2a-2f via the transmission line interfaces. In FIG. 8, horizontal axes show a time axis, and rectangles placed along the time axes represent messages transmitted and received between the individual devices. For example, the messages placed on the transmission side on the time axes are transmission messages, and the messages placed on the receiving side are reception messages. The length of a rectangle in the time axis direction indicates the time taken by the transmission and reception of the message. In the following description, only transmission line occupying duration based on a transfer rate of the transmission line is considered without considering the processing delay of the individual devices or the propagation delay of the transmission line. Incidentally, the written form of the timing chart of FIG. 8 is also applied to timing charts which will be described after FIG. 8.

The vehicle monitoring control device 2a serving as the transmission control station repeats the communication cycle periodically using the timer, and broadcasts a cycle start message 500a to the vehicle monitoring control devices 2b-2f and relay devices 1a-1c at the point of the cycle start. The cycle start message 500a broadcast is sent to the vehicle monitoring control device 2b via the relay device 1a, to the vehicle monitoring control devices 2c and 2d via the relay device 1a and relay device 1b, and to the vehicle monitoring control devices 2e and 2f via the relay device 1b and relay device 1c.

Subsequently, the vehicle monitoring control device 2a broadcasts a message to be communicated periodically (referred to as "periodic message" from now on) (not shown) including the monitoring control data on its own vehicle to the vehicle monitoring control devices 2b-2f and relay devices 1a-1c. Receiving cycle start message 500a broadcast from the vehicle monitoring control device 2a, the relay devices 1a-1c and vehicle monitoring control devices 2b-2f start the communication cycle in accordance with the contents of the cycle information read out of the cycle start message 500a.

Incidentally, as for the broadcast of the cycle start message 500a, owing to the delay involved in the store and forward scheme, arrival times of the cycle start message 500a differ from node to node corresponding to the relay devices 1a-1c and vehicle monitoring control devices 2b-2f. Accordingly, as shown in FIG. 8, start times of the communication cycles corresponding to the cycle start message 500a vary from node to node, at which time the vehicle monitoring control devices 2b-2f broadcast a periodic message (not shown) including the monitoring control data on its own vehicle.

Having started the communication cycles, the relay devices 1a-1c and vehicle monitoring control devices 2b-2f each monitor elapsed time from the cycle start using the timer, and make a transition of the state of the communication cycle in such a manner as the aperiodic communication disabled period, aperiodic communication enabled period, and idle period (see cycle N in FIG. 8). Incidentally, since the arrival times of the cycle start message 500a to the individual nodes differ as described above, the time of start and end of the aperiodic communication disabled period, aperiodic communication enabled period, and idle period differ from node to node as shown in FIG. 8.

Here, consider a case where at time T1, the monitoring record management section 22 of the vehicle monitoring control device 2e transmits a message to be communicated aperiodically (referred to as "aperiodic message" from now on) to the vehicle monitoring control device 2a. The aperiodic message processing section 27 of the vehicle monitoring control device 2e creates an aperiodic message 700e and stores it to the aperiodic message queue 217. In the vehicle monitoring control device 2e, time T1 is within the aperiodic communication disabled period of the communication cycle N. Accordingly, the transmission message selecting section 215 of the vehicle monitoring control device 2e leaves the message in the aperiodic message queue 217 as it is.

After that, at time T2 when the aperiodic communication enabled period of the communication cycle N starts, the transmission message selecting section 215 picks out the aperiodic message 700e stored in the aperiodic message queue 217, and transmits the aperiodic message 700e (the rectangle denoted by the reference symbol N in FIG. 8) via the intra-set transmission line interface 28. The time at which the intra-set transmission line interface 18 of the relay device 1c completes the reception of the aperiodic message 700e becomes time T3 because it passes through the switching hub 17.

The aperiodic message 700e received by the relay device 1c is supplied to the message type deciding section 114a via the cycle start message deciding section 112 and relay destination deciding section 113 in the relay device 1c. When the message type deciding section 114a makes a decision that the input message is the aperiodic message 700e, it stores the aperiodic message 700e in the aperiodic message queue 117a. In the relay device 1c, since time T3 is in the aperiodic communication enabled period, the transmission message selecting section 115a immediately picks out the aperiodic message 700e from the aperiodic message queue 117a, and transmits via the inter-set transmission line interface 19a.

The relay device 1b receives the aperiodic message 700e from the relay device 1c via the inter-set transmission line interface 19b, and completes the reception at time T4. After that, carrying out the same processing as the relay device 1c, the relay device 1b stores the aperiodic message 700e in the internal aperiodic message queue 117a. In the relay device 1b, at time T4, the aperiodic communication enabled period has ended and shifted to the idle period. Accordingly, the aperiodic message 700e is held in the aperiodic message queue 117a until being shifted to the aperiodic communication enabled period of the next communication cycle N+1.

The vehicle monitoring control device 2a, which is the transmission control station, broadcasts the cycle start message 500b about the next communication cycle N+1 to the vehicle monitoring control devices 2b-2f and relay devices 1a-1c. Thus, the communication cycle N+1 is started. Receiving the cycle start message 500b at time T5, the vehicle monitoring control device 2c starts the communication cycle N+1 in accordance with the contents of the cycle information picked out of the cycle start message 500b.

Subsequently, the vehicle monitoring control device 2c broadcasts a periodic message 600c (shown by the rectangle denoted by the reference symbol C in FIG. 8) including the monitoring control data of its own vehicle. Incidentally, in the example shown in FIG. 8, a flow up to the reception of the periodic message 600c by the vehicle monitoring control device 2a via the relay devices 1a and 1b is shown, but a flow up to the vehicle monitoring control devices 2b and 2d-2f is omitted.

In the relay device 1b, the aperiodic message 700e has arrived before the arrival of the periodic message 600c. In this case, since the relay device 1b is in the aperiodic communication disabled period in the communication cycle N+1, the aperiodic message 700e is left stored in the aperiodic message queue 117a.

On the other hand, the periodic message 600c is read out of the periodic message queue 116a immediately by the transmission message selecting section 115a, and is transmitted to the relay device 1a via the inter-set transmission line interface 19a and inter-set transmission line 9a. In this way, the relay device 1b can transmit the periodic message 600c without delay due to the transmission processing of the aperiodic message 700e.

As the time has passed and time T7 comes, the relay device 1b shifts to the aperiodic communication enabled period. Thus, the transmission message selecting section 115a of the relay device 1b reads the aperiodic message 700e out of the aperiodic message queue 117a, and transmits it to the relay device 1a via the inter-set transmission line interface 19a and inter-set transmission line 9a.

Next, the operation will be described in the case where in the train communication system of the embodiment 1, only the vehicle monitoring control device 2, which is the origin of the message, carries out communication in the communication cycles based on the cycle information, but the relay devices 1 do not carry out communication in the communication cycles.

Figure 9:
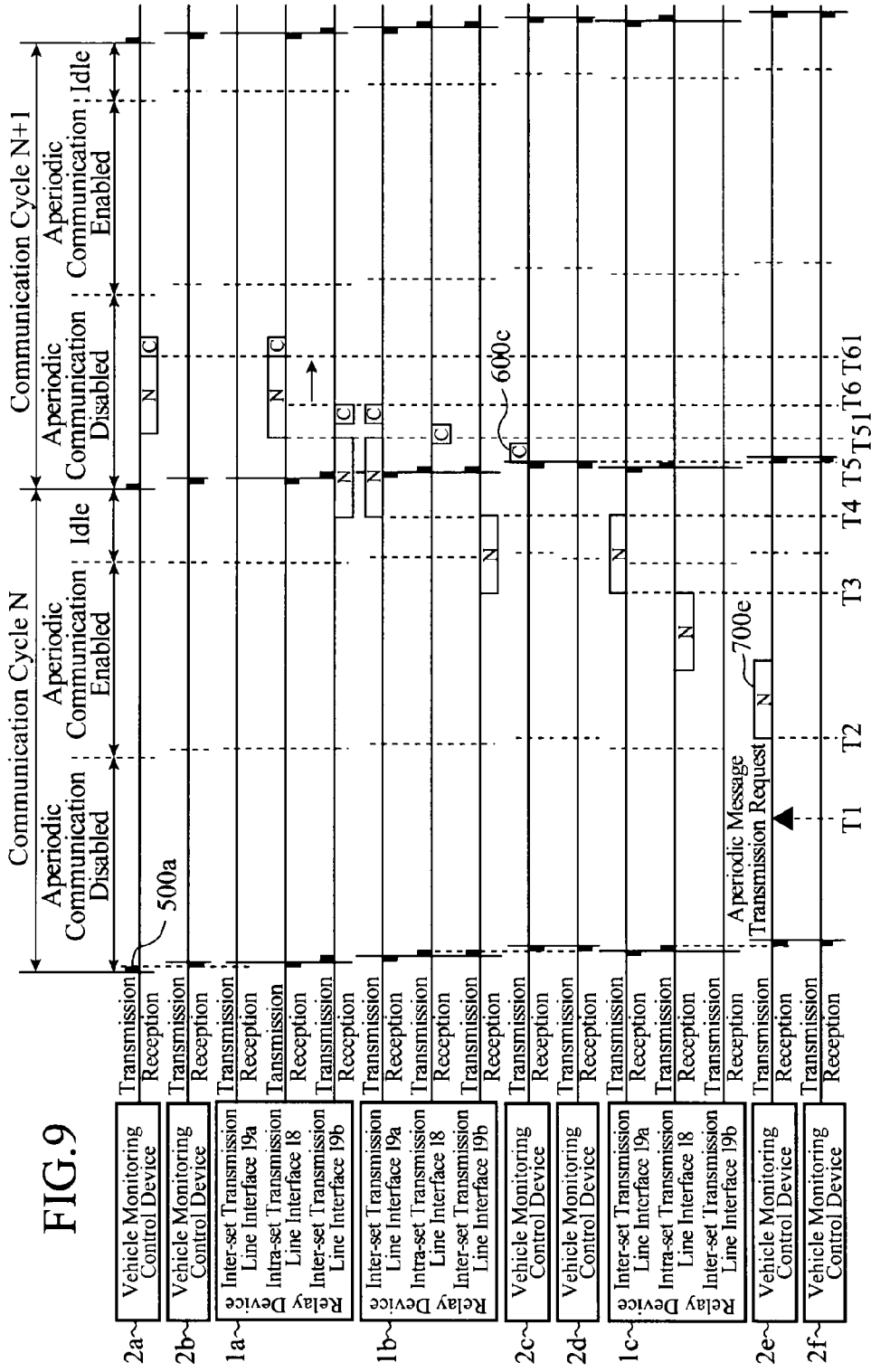
FIG. 9 is a timing chart showing the operation when an aperiodic message delays transmission of a periodic message.

FIG. 9 is a timing chart showing the operation in the case where the aperiodic message delays the transmission of the periodic message because only the vehicle monitoring control device carries out the communication in the communication cycles based on the cycle information. Incidentally, FIG. 9 shows an operation example for comparing with the characteristic operation of the present invention shown in FIG. 8, and hence does not show the operation of the present invention.

First, as in FIG. 8, the vehicle monitoring control device 2a serving as the transmission control station repeats the communication cycle periodically using the timer, and broadcasts a cycle start message 500a to the vehicle monitoring control devices 2b-2f and relay devices 1a-1c at the point of the cycle start.

Subsequently, the vehicle monitoring control device 2a broadcasts a periodic message (not shown) including the monitoring control data on its own vehicle to the vehicle monitoring control devices 2b-2f and relay devices 1a-1c. Receiving the cycle start message 500a broadcast from the vehicle monitoring control device 2a, the vehicle monitoring control devices 2b-2f start the communication cycle in accordance with the contents of the cycle information read out of the cycle start message 500a.

Having started the communication cycles, the vehicle monitoring control devices 2b-2f each monitor elapsed time from the cycle start using the timer, and make a transition of the state of the communication cycle in such a manner as the aperiodic communication disabled period, aperiodic communication enabled period, and idle period.

Here, consider a case where at time T1, the monitoring record management section 22 of the vehicle monitoring control device 2e transmits an aperiodic message to be communicated aperiodically to the vehicle monitoring control device 2a. The aperiodic message processing section 27 of the vehicle monitoring control device 2e creates an aperiodic message 700e and stores it to the aperiodic message queue 217. In this case, since time T1 is within the aperiodic communication disabled period of the communication cycle N, the transmission message selecting section 215 leaves the message in the aperiodic message queue 217 as it is.

At time T2 when the aperiodic communication enabled period of the communication cycle N starts, the transmission message selecting section 215 of the vehicle monitoring control device 2e picks out the aperiodic message 700e stored in the aperiodic message queue 217, and transmits the aperiodic message 700e via the intra-set transmission line interface 28. The time at which the intra-set transmission line interface 18 of the relay device 1c completes the reception of the aperiodic message 700e becomes time T3 because it passes through the switching hub 17.

The relay device 1c stores the aperiodic message 700e received via the intra-set transmission line 8e in the aperiodic message queue 117a. In FIG. 9, being different from FIG. 8, the relay device 1c does not carry out communication in the communication cycle based on the contents of the cycle information in the cycle start message. Accordingly, the transmission message selecting section 115a of the relay device 1c immediately picks out the aperiodic message 700e from the aperiodic message queue 117a, and transmits it through the inter-set transmission line interface 19a.

The relay device 1b receives the aperiodic message 700e from the relay device 1c via the inter-set transmission line interface 19b and inter-set transmission line 9b, and completes the reception at time T4. In FIG. 9, being different from FIG. 8, the relay device 1b does not carry out communication in the communication cycles based on the contents of the cycle information in the cycle start message. Accordingly, the relay device 1b immediately transmits the received aperiodic message 700e to the relay device 1a via the inter-set transmission line interface 19a and inter-set transmission line 9a.

The relay device 1a completes at time T51 the reception of the aperiodic message 700e from the relay device 1b via the inter-set transmission line interface 19b. Likewise, since the relay device 1a does not carry out communication in the communication cycles based on the contents of the cycle information in the cycle start message, it transmits the received aperiodic message 700e immediately to the vehicle monitoring control device 2a via the intra-set transmission line interface 18 and inter-set transmission line 8a.

As in FIG. 8, the vehicle monitoring control device 2c starts transmission of the periodic message 600c at time T5. The relay device 1a receives at time T6 the periodic message 600c transmitted by way of the relay device 1b via the inter-set transmission line interface 19b. In this case, since the relay device 1a has already started the transmission of the aperiodic message 700e at time T51, the intra-set transmission line interface 18 is occupied by the transmission of the aperiodic message 700e. Accordingly, the relay device 1a cannot transmit the periodic message 600c until time T61 at which the transmission of the aperiodic message 700e is completed. Thus, the transmission of the periodic message 600c delays in the relay device 1a.

The delay due to the message that has already occupied the transmission line cannot be avoided by only the priority transmission control using the priority-specific queue as the conventional device. More specifically, when the vehicle monitoring control devices 2 carry out communication in the communication cycles based on the contents of the cycle information, it is necessary for the relay devices 1 to provide a sufficiently long idle period to avoid a conflict between the periodic message and the aperiodic message. In the example of FIG. 9, the end time of the idle period of the communication cycle N, that is, the start time of the next communication cycle N+1 must be at least on and after time T61 at which the transmission of the aperiodic message 700e is completed.

It is necessary for the idle period to have such a duration that can completely eliminate the conflict between the foregoing periodic message and the aperiodic message. For example, the idle period must be longer than the worst value of the time taken to transmit a message from a vehicle monitoring control device 1 to another vehicle monitoring control device 1. Incidentally, as the worst value, a time is conceivable which includes the delay that is due to the communication between the remotest vehicle monitoring control devices and is caused by the conflict with other aperiodic messages during the communication in the train communication system.

In contrast with this, as for the train communication system of the embodiment 1, the relay device 1 also carries out communication in the communication cycle based on the contents of the cycle information. In this case, a longer time between the time required for transmitting a message between the adjacent relay devices 1 and the time required for transmitting a message between the relay device 1 and the vehicle monitoring control device 2, which are connected directly, is adopted as the idle period. In this way, the conflict between the periodic message and the aperiodic message can be eliminated, and the utilization efficiency of the transmission lines can be improved as compared with the case shown in FIG. 9.

As described above, according to the embodiment 1, the relay devices 1 and vehicle monitoring control devices 2 have the communication cycle management sections 111 and 211 for managing the communication cycles in accordance with the cycle information that divides the communication cycles into the communication enabled periods corresponding to the communication periods of a message which include the periods enabling only the communication of the message to be communicated periodically, and carry out the communication in the communication cycles managed by the communication cycle management sections 111 and 211.

In addition, in the configuration, the vehicle monitoring control device 2 operating as the transmission control station transmits, at the start point of the communication cycle, the cycle start message containing the cycle information to the relay devices 1 and vehicle monitoring control devices 2, which operate as the transmission subsidiary stations, and carries out communication in the communication cycles in accordance with the time elapsed counted from the start point of the communication cycle; and the relay devices 1 and the vehicle monitoring control devices 2 operating as the transmission subsidiary station start, at the receiving points of time of the cycle start message, the communication in the communication cycles in accordance with the cycle information in the cycle start message, and carryout communication in the communication cycles in accordance with the time elapsed counted from the reception points of the cycle start message.

In the configuration, the cycle information is utilized which divides the communication cycles to the aperiodic communication disabled period that enables the communication of only a message to be communicated periodically, the aperiodic communication enabled period that enables the communication of a message allowed to do aperiodic communication, and the idle period that enables the communication of only the cycle start message and a message during the communication. With the configuration as described above, it becomes possible to eliminate the condition that can impair the real time quality of the message to be communicated periodically because of the message allowed to do the aperiodic communication.

In addition, according to the embodiment 1, when relaying the communication between the vehicle monitoring control devices 2, the relay devices 1 relay in the communication cycles managed in accordance with the cycle information, thereby being able to achieve the same advantage as described above. In addition, when relaying the communication between the vehicle monitoring control devices 2, by adjusting the length of the idle period in such a manner that the next communication cycle is not started until the message whose transmission has been started at a particular communication cycle is received completely by the closest relay device on the transmission route or by the vehicle monitoring control device at the transmission destination, the conflict between the periodic message and the aperiodic message can be eliminated, and the utilization efficiency of the transmission line can be improved.

Embodiment 2

Figure 10:
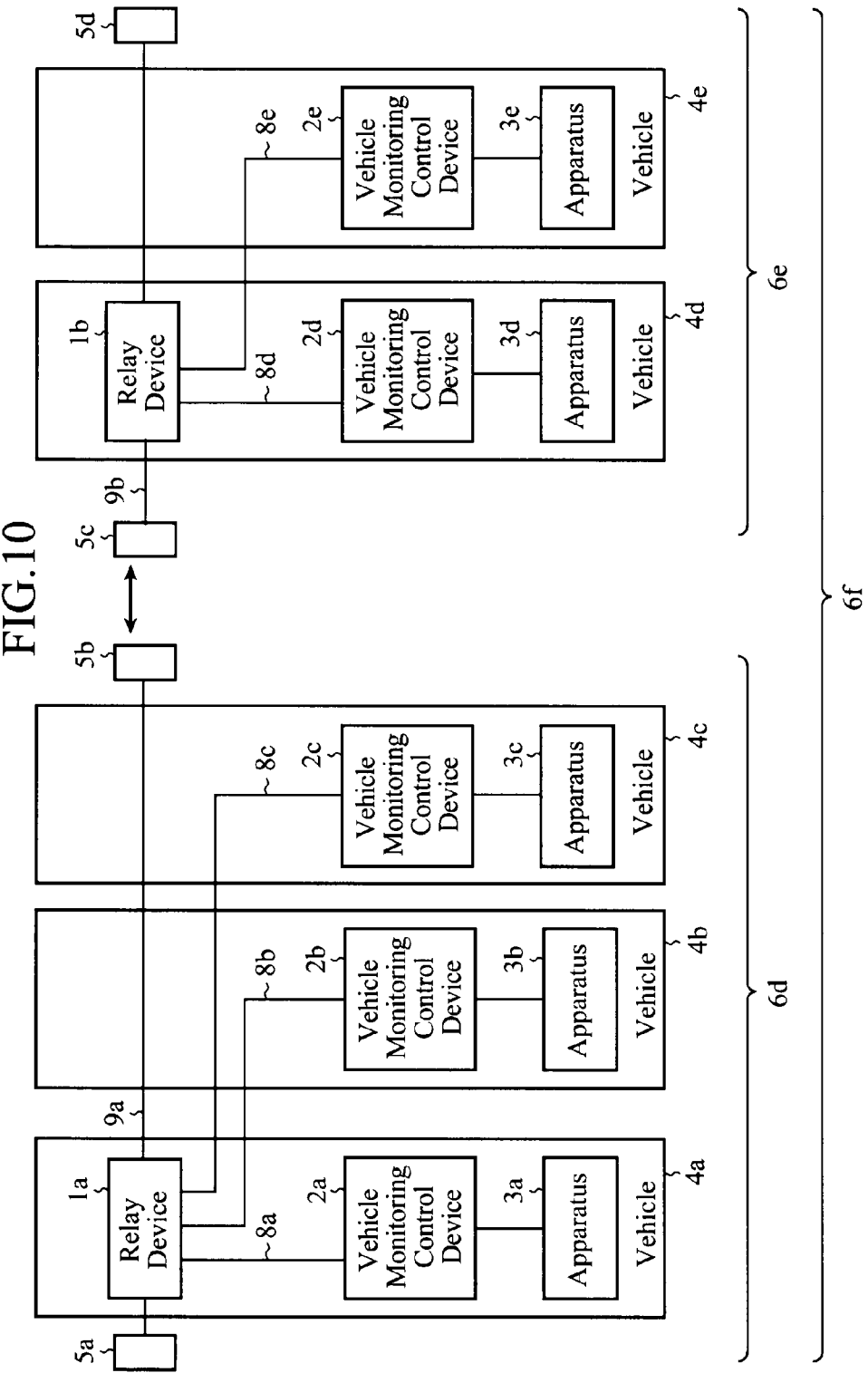
FIG. 10 is a block diagram showing a configuration of a train communication system of an embodiment 2 in accordance with the present invention.

FIG. 10 is a block diagram showing a configuration of a train communication system of an embodiment 2 in accordance with the present invention. In FIG. 10, explanation will be made by way of example of a railroad train having vehicles 4a-4c constituting a set 6d of three cars, and vehicles 4d and 4e constituting a set 6e of two cars. The train communication system of the embodiment 2 includes relay devices 1a and 1b, vehicle monitoring control devices 2a-2e, and automatic couplers 5a-5d. The relay devices 1a and 1b are installed in the sets 6d and 6e to relay the communication between the individual vehicle monitoring control devices 2a-2e via the on-vehicle network. The vehicle monitoring control devices 2a-2e are mounted on the individual vehicles 4a-4e to perform monitoring control of apparatuses 3a-3e. The apparatuses 3a-3e are vehicle equipment mounted on the individual vehicles 4a-4e.

The relay device 1a is connected to the vehicle monitoring control devices 2a-2c in the set 6d via intra-set transmission lines 8a-8c. Likewise, the relay device 1b is connected to the vehicle monitoring control devices 2d and 2e in the set 6e via the intra-set transmission lines 8d and 8e. The relay device 1a is connected to the automatic coupler 5a and inter-set transmission line 9a, and the relay device 1b is connected to the automatic coupler 5d and inter-set transmission line 9b. The inter-set transmission line 9a is connected to the automatic coupler 5b, and the inter-set transmission line 9b is connected to the automatic coupler 5c.

The automatic couplers 5a-5d connect the inter-set transmission lines 9 as well when coupling the vehicles of the sets. For example, the automatic couplers 5b and 5c couple the vehicle 4 of the set 6d and the vehicle of the set 6e, and connect the inter-set transmission lines 9a and 9b. Thus, the inter-set transmission lines 9a and 9b have their connection closed or opened by the coupling or decoupling of the automatic couplers 5b and 5c. In addition, a set 6f is formed by coupling the set 6d and set 6e with the automatic couplers 5b and 5c.

The present embodiment 2 assumes that only one transmission control station is determined within a limited time in the train when the train is started, or the sets are coupled or decoupled. As for a method of deciding the transmission control station (method of establishing the transmission control station) in the embodiment 2, it is not limited to a particular method. For example, a method disclosed in Reference 1 can be used.

Reference 1: Japanese Patent Publication No. 7-46881/1995.

FIG. 11 is a diagram showing a structure of a cycle start message of the embodiment 2. In FIG. 11, the cycle start message is composed of fields corresponding to a message identifier, a transmission source identifier, a transmission control station change flag, cycle length, aperiodic communication disabled duration, and aperiodic communication enabled duration, respectively.

In the present embodiment 2, the transmission source identifier, transmission control station change flag, cycle length, aperiodic communication disabled duration, and aperiodic communication enabled duration are referred to as cycle information collectively. Incidentally, the transmission control station change flag is set when the vehicle monitoring control device 2 operating as the transmission control station is changed to a transmission subsidiary station in company with the coupling or decoupling of the sets.

Next, the operation will be described.

(1) Operation by Communication Cycle Management Section in Control Station Mode.

Figure 12:
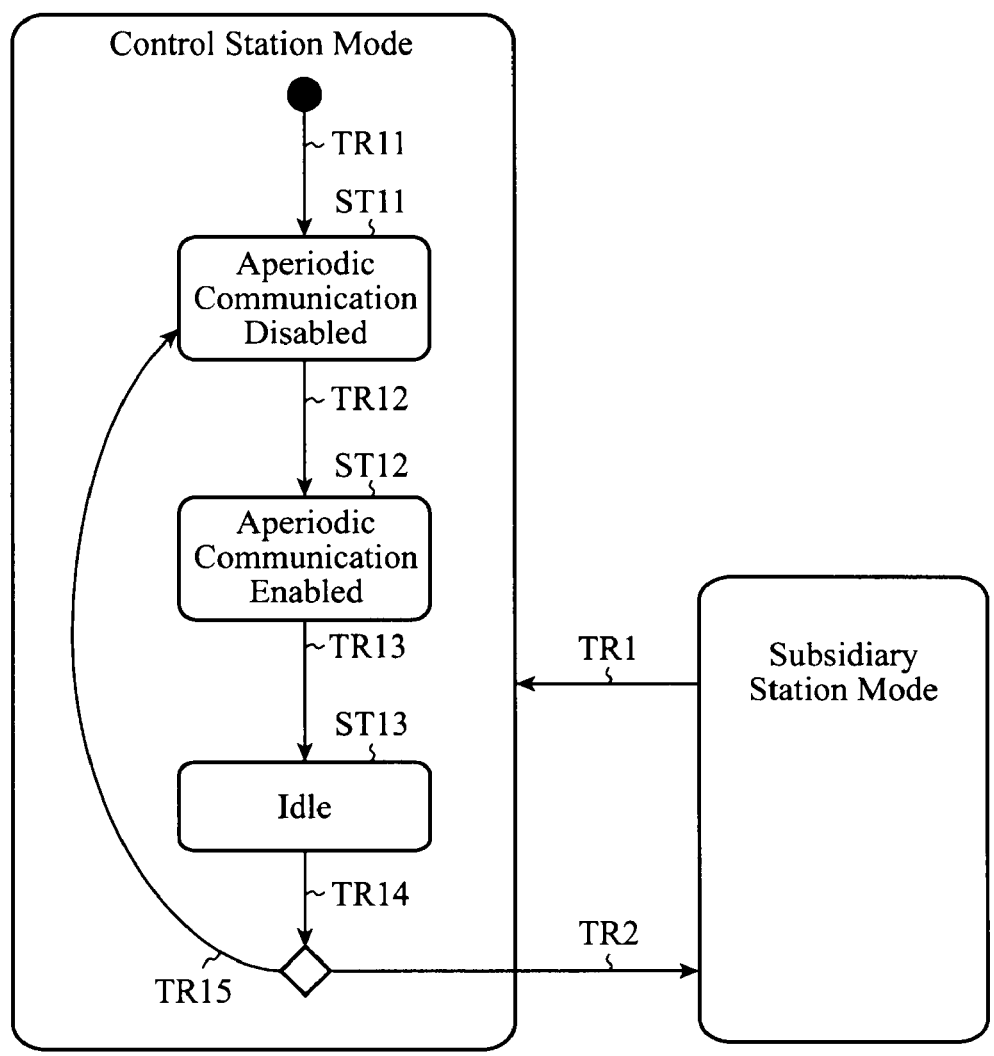
FIG. 12 is a diagram showing communication state transition of a communication cycle management section of a vehicle monitoring control device which is a transmission control station in the train communication system in FIG. 10.

FIG. 12 is a diagram showing communication state transition of the communication cycle management section of the vehicle monitoring control device operating as the transmission control station in the train communication system in FIG. 10. Incidentally, the configurations of the vehicle monitoring control devices 2a-2e of the embodiment 2 are basically the same as those shown in FIGS. 4-7 described in the foregoing embodiment 1.

In the following, the operation of the communication cycle management section 211 of the vehicle monitoring control device 2 operating as the transmission control station will be described in detail with reference to FIG. 12 and FIGS. 6 and 7 shown in the foregoing embodiment 1. In addition, it is assumed in FIG. 12 that the communication cycle management section 211 of the vehicle monitoring control device 2 operating as the transmission control station is in a control station mode as its operation mode, and that the communication cycle management sections 111 and 211 of the relay devices 1 and vehicle monitoring control devices 2, which operate as the transmission subsidiary stations, are in a subsidiary station mode as their operation mode.

First, the communication cycle management section 211 in the control station mode starts the timer at the start point of the communication cycle, and broadcasts, without setting the transmission control station change flag, the cycle start message to the communication cycle management sections 211 in the subsidiary station mode via the transmission message selecting section 215 and intra-set transmission line interface 28. This will shift the communication cycle management section 211 in the control station mode to an aperiodic communication disabled state ST11 (transition TR11).

The communication cycle management section 211 in the control station mode makes a transition from the aperiodic communication disabled state ST11 to an aperiodic communication enabled state ST12 when the aperiodic communication disabled period (fixed time period) based on the contents of the cycle information has elapsed from the start of the communication cycle (transition TR12). In addition, when the aperiodic communication enabled period (fixed time period) has elapsed, the communication cycle management section 211 makes a transition from the aperiodic communication enabled state ST12 to an idle state ST13 (transition TR13).

When making a transition to a state after the idle period (fixed time period) has elapsed (transition TR14), the communication cycle management section 211 in the control station mode broadcasts, without setting the transmission control station change flag, a cycle start message about the next communication cycle to the communication cycle management sections 111 and 211 in the subsidiary station mode via the transmission message selecting section 215 and intra-set transmission line interface 28. This will shift the communication cycle management section 211 in the control station mode to the aperiodic communication disabled state ST11 (transition TR15).

On the other hand, if the communication cycle management section 211 in the control station mode is to be shifted, before the idle period has elapsed, to the transmission subsidiary station with the coupling or decoupling of the sets, it sets the transmission control station change flag to the cycle information in the cycle start message about the next communication cycle.

After that, the communication cycle management section 211 in the control station mode broadcasts the cycle start message to which the transmission control station change flag is set to the communication cycle management sections 211 in the subsidiary station mode via the transmission message selecting section 215 and intra-set transmission line interface 28. Thus, the vehicle monitoring control device 2 operating as the transmission control station shifts to a transmission subsidiary station (subsidiary station mode) (transition TR2).

(2) Operation by Communication Cycle Management Section in Subsidiary Station Mode.

Figure 13:
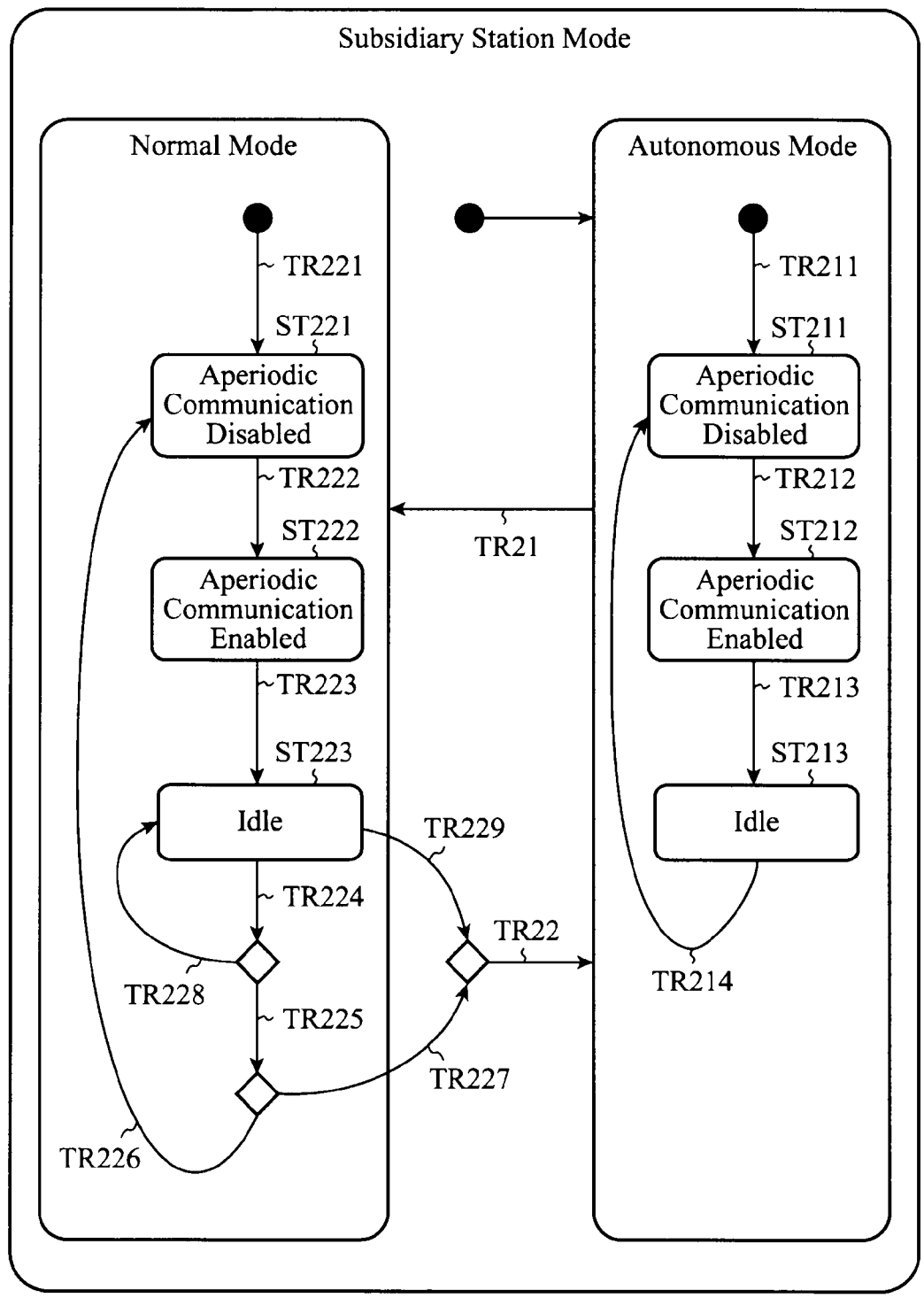
FIG. 13 is a diagram showing communication state transition of a communication cycle management section of a vehicle monitoring control device and relay device, which are a transmission subsidiary station in the train communication system in FIG. 10.

FIG. 13 is a diagram showing the communication state transition of the communication cycle management sections of the vehicle monitoring control devices and relay devices, which operate as the transmission subsidiary stations, in the train communication system of FIG. 10. Incidentally, the configurations of the relay devices 1a and 1b and vehicle monitoring control devices 2a-2e of the embodiment 2 are basically the same as those of FIGS. 4-7 shown in the foregoing embodiment 1. Incidentally, the subsidiary station mode has a normal mode that manages the communication cycle in accordance with the cycle start message from the transmission control station, and an autonomous mode that manages the communication cycles in accordance with its own timer.

The communication cycle management sections 111 and 211 in the subsidiary station mode enter into the autonomous mode immediately after the start, and start the timer. At the same time, the communication cycle management sections 111 and 211 in the subsidiary station mode start the aperiodic communication disabled period based on the contents of the cycle information stored in advance, thereby entering into the aperiodic communication disabled state ST211 (transition TR211).

The communication cycle management sections 111 and 211 in the autonomous mode start the communication cycle, and make a transition from the aperiodic communication disabled state ST211 to the aperiodic communication enabled state ST212 when the aperiodic communication disabled period (fixed time period) based on the contents of the cycle information has elapsed (transition TR212). In addition, when the aperiodic communication enabled period (fixed time period) has elapsed, the communication cycle management sections 111 and 211 make a transition from the aperiodic communication enabled state ST212 to the idle state ST213 (transition TR213). Subsequently, when the start time of the next communication cycle comes, the communication cycle management sections 111 and 211 in the autonomous mode shift to the aperiodic communication disabled state ST211 (transition TR214).

In the autonomous mode, the storage content of the transmission source identifier of the cycle start message is vacant. Receiving the cycle start message in the autonomous mode, the communication cycle management sections 111 and 211 store into the cycle information storage sections 118 and 218 the transmission source identifier in the cycle start message, and make a transition to the normal mode (transition TR21).

The communication cycle management sections 111 and 211 in the normal mode start the timer at the receiving point of the cycle start message. Thus, the communication cycle management sections 111 and 211 in the normal mode start the aperiodic communication disabled period based on the contents of the cycle information in the cycle start message, and enters into the aperiodic communication disabled state ST221 (transition TR221).

The communication cycle management sections 111 and 211 in the normal mode make a transition from the aperiodic communication disabled state ST221 to the aperiodic communication enabled state ST222 (transition TR222) when the aperiodic communication disabled period (fixed time period) based on the contents of the cycle information has elapsed from the start of the communication cycle. In addition, when the aperiodic communication enabled period (fixed time period) has elapsed, the communication cycle management sections 111 and 211 make a transition from the aperiodic communication enabled state ST222 to the idle state ST223 (transition TR223).

When not receiving any cycle start message for a certain time period in the idle state ST223 (transition TR229), the communication cycle management sections 111 and 211 erase the content of the transmission source identifier stored in the cycle information storage sections 118 and 218, and make a transition to the autonomous mode (transition TR22).

On the other hand, when receiving the cycle start message in the idle state ST223 (transition TR224), the communication cycle management sections 111 and 211 compare the content of the transmission source identifier of the received cycle start message with the content of the transmission source identifier read out of the cycle information storage sections 118 and 218. Unless the contents of the two transmission source identifiers agree, the communication cycle management sections 111 and 211 make a transition to the idle state ST223 (transition TR228).

In contrast, when the contents of the two transmission source identifiers agree (transition TR225), and if the transmission control station change flag of the cycle start message has been set (transition TR227), the communication cycle management sections 111 and 211 erase the content of the transmission source identifier stored in the cycle information storage sections 118 and 218 and make a transition to the autonomous mode (transition TR22).

Unless the transmission control station change flag of the cycle start message has been set in the transition TR225, the communication cycle management sections 111 and 211 consider it as the cycle start message about the next communication cycle from the vehicle monitoring control device 2 operating as a transmission control station, reset the timer, and make a transition to the aperiodic communication disabled state ST221 (transition TR226).

(3) Operation at Coupling of Sets.

Figure 14:
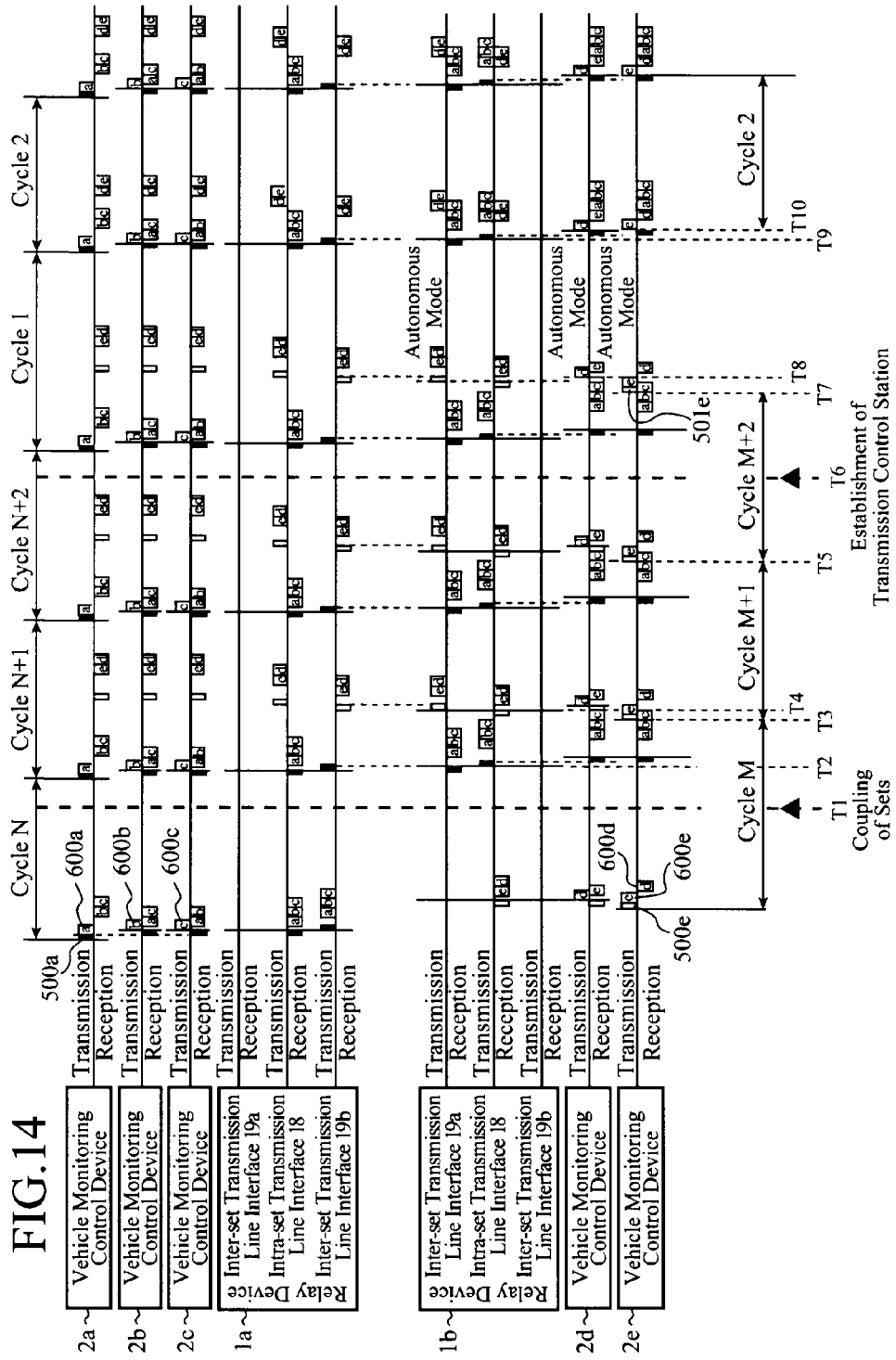
FIG. 14 is a timing chart showing a flow of the operation at a coupling of sets in the train communication system in FIG. 10.

FIG. 14 is a timing chart showing a flow of the operation at a coupling of sets in the train communication system in FIG. 10, which shows a case of coupling the set 6d in which the vehicle monitoring control device 2a is the transmission control station and the set 6e in which the vehicle monitoring control device 2e is the transmission control station.

In the set 6d, the vehicle monitoring control device 2a operating as a transmission control station broadcasts a cycle start message 500a (denoted by a black rectangle in FIG. 14) to the vehicle monitoring control devices 2b and 2c and relay device 1a at the start point of the communication cycle N. Next, the vehicle monitoring control device 2a broadcasts a periodic message 600a containing the monitoring control data of its own vehicle 4a to the vehicle monitoring control devices 2b and 2c and relay device 1a.

The cycle start message 500a and periodic message 600a broadcast are transmitted to the vehicle monitoring control devices 2b and 2c via the relay device 1a. Receiving the cycle start message 500a, the vehicle monitoring control devices 2b and 2c broadcast periodic messages 600b and 600c containing the monitoring control data on the vehicles 4b and 4c, respectively, via the intra-set transmission lines 8b and 8c. Thus, the vehicle monitoring control device 2b receives the periodic messages 600a and 600c, and the vehicle monitoring control device 2c receives the periodic messages 600a and 600b.

In the set 6e, likewise, the vehicle monitoring control device 2e operating as a transmission control station broadcasts a cycle start message 500e (denoted by a white rectangle in FIG. 14) to the vehicle monitoring control device 2d and relay device 1b at the start point of the communication cycle M. Next, the vehicle monitoring control device 2e broadcasts a periodic message 600e containing the monitoring control data of its own vehicle 4e to the vehicle monitoring control device 2d and relay device 1b.

The cycle start message 500e and periodic message 600e broadcast are transmitted to the vehicle monitoring control device 2d via the relay device 1b. Receiving the cycle start message 500e, the vehicle monitoring control device 2d starts the timer by considering the receiving point of the cycle start message 500e as the start timing of the communication cycle. Next, the vehicle monitoring control device 2d broadcasts the periodic message 600d containing the monitoring control data on the vehicles 4d via the intra-set transmission lines 8d and 8e. Thus, the vehicle monitoring control device 2d receives the periodic message 600e, and the vehicle monitoring control device 2e receives the periodic message 600d.

Consider the case where the sets 6d and 6e are coupled into a set at time T1. In this case, the inter-set transmission lines 9a and 9b are connected via the automatic couplers 5b and 5c, and a message of a party set coupled into the set flows to the on-vehicle network of its own set. In this case, the communication cycle management section 111 of the relay device 1b stores, in the cycle information storage section 118, the transmission source identifier of the cycle start message 500e (identifier for identifying the vehicle monitoring control device 2e) to which the relay device 1b is subordinate now.

On the other hand, receiving the cycle start message 500a from the set 6d at time T2 via the inter-set transmission lines 9a and 9b and automatic couplers 5b and 5c, the communication cycle management section 111 of the relay device 1b compares the transmission source identifier of the cycle start message 500a (identifier for identifying the vehicle monitoring control device 2a) with the content of the transmission source identifier the cycle information storage section 118 stores at present. Here, since the cycle information storage section 118 stores the transmission source identifier for identifying the vehicle monitoring control device 2e, the contents of the two transmission source identifiers differ. Accordingly, the communication cycle management section 111 of the relay device 1b does not consider the reception of the cycle start message 500a as a cycle start.

The cycle start message 500e transmitted from the vehicle monitoring control device 2e at time T3 is received by the relay device 1b at time T4. The communication cycle management section ill of the relay device 1b compares the transmission source identifier of the cycle start message 500e received at time T4 with the content of the transmission source identifier the cycle information storage section 118 stores now. Here, since it agrees with the content of the transmission source identifier the cycle information storage section 118 stores now, the communication cycle management section 111 of the relay device 1b manages the communication cycle M+1 in accordance with the contents of the cycle information in the cycle start message 500e.

Assume that at time T6 the vehicle monitoring control device 2a is established as the transmission control station of the set 6f after the coupling of the sets. At this point of time, the vehicle monitoring control device 2e, which was the transmission control station of the set 6e, becomes a transmission subsidiary station. Accordingly, at time T7, which is the first start timing of the communication cycle after time T6 (end time of the communication cycle M+2), the vehicle monitoring control device 2e broadcasts a cycle start message 501e in which the transmission control station change flag is set.

The communication cycle management section 211 of the vehicle monitoring control device 2d and the communication cycle management section 111 of the relay device 1b recognize the change of the vehicle monitoring control device 2e to the transmission subsidiary station according to the transmission control station change flag of the cycle start message 501e received from the vehicle monitoring control device 2e, and erase, after starting the timers, the contents of the transmission source identifier (identifier for identifying the vehicle monitoring control device 2e) of the cycle start message the cycle information storage sections 118 and 218 store now. After that, the communication cycle management section 211 of the vehicle monitoring control device 2d and the communication cycle management section 111 of the relay device 1b make a transition to the autonomous mode, and manages the start timing of the communication cycle with their own timers.

At time T9, the relay device 1b of the set 6e receives the cycle start message 500a from the vehicle monitoring control device 2a operating as a transmission control station after the coupling of the sets. In this case, the communication cycle management section 111 of the relay device 1b does not retain the content of the transmission source identifier of the cycle start message in the cycle information storage section 118. Thus, the communication cycle management section 111 of the relay device 1b stores the content of the transmission source identifier of the cycle start message 500a in the cycle information storage section 118, and starts the timer by considering the reception point of the cycle start message 500a as the start timing of the communication cycle.

After that, the communication cycle management section 111 of the relay device 1b manages the communication cycle 2 in accordance with the cycle start message 500a from the vehicle monitoring control device 2a. Receiving the cycle start message 500a via the relay by the relay device 1b at time T10, the vehicle monitoring control devices 2d and 2e store the content of the transmission source identifier of the cycle start message 500a in the cycle information storage sections 218, and manage the communication cycle 2 forward in accordance with the cycle start message 500a. In this way, the communication cycle is established over the whole train (set 6f) after the coupling of the sets 6d and 6e.

Incidentally, during the time up to the communication cycle of the whole train is established after the coupling of the sets, the relay device 1 relays the message from the other set in accord with the communication cycle of its own set. In this way, it is possible to prevent the aperiodic message flowing from the other set from delaying the periodic message of its own set.

(4) Operation at Decoupling of Sets.

Figure 15:
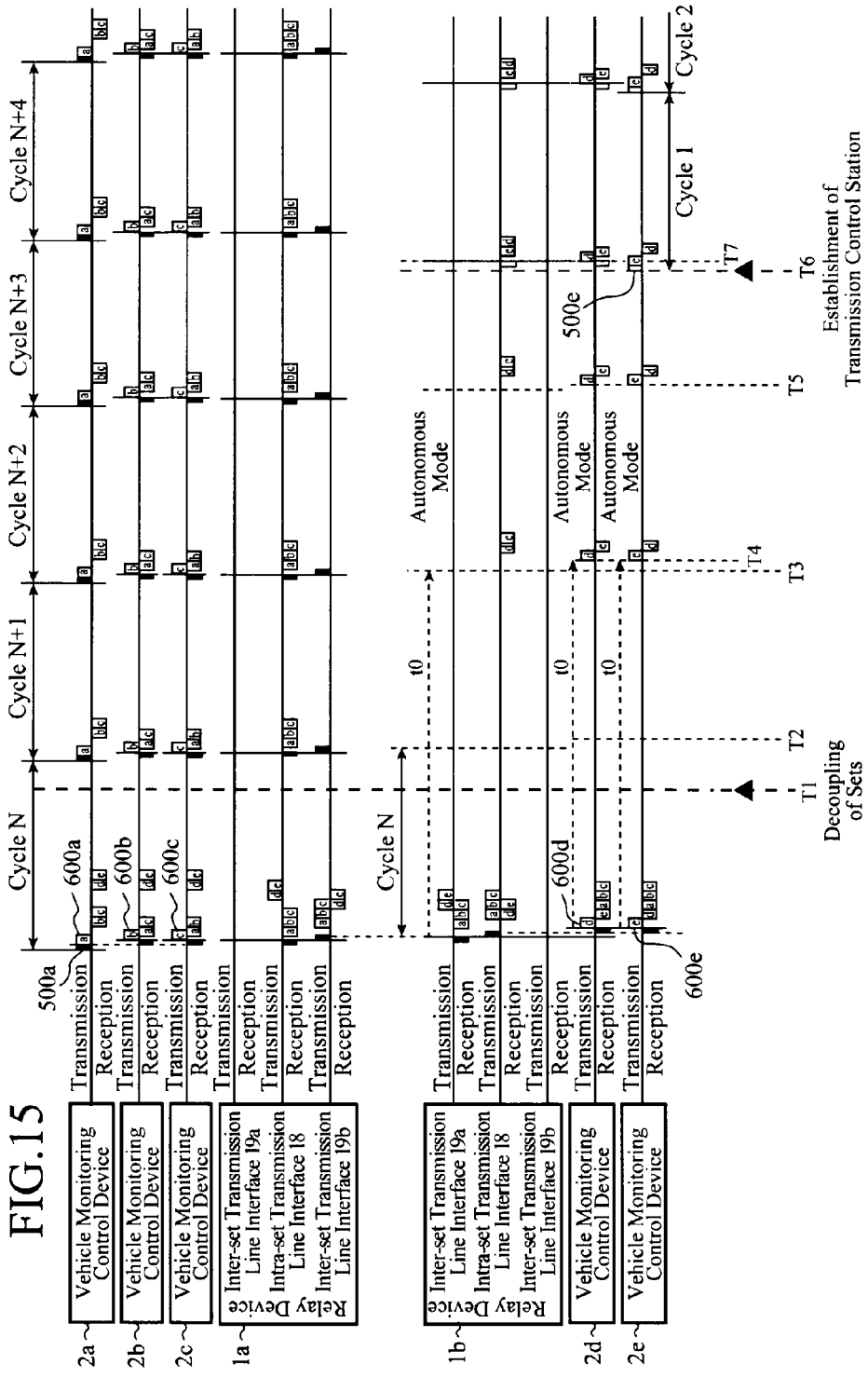
FIG. 15 is a timing chart showing a flow of the operation at a decoupling of sets in the train communication system in FIG. 10.

FIG. 15 is a timing chart showing a flow of the operation at the decoupling of the sets in the train communication system in FIG. 10, in which the set 6f is separated to the sets 6d and 6e. It is assumed here that the transmission control station in the set 6f is the vehicle monitoring control device 2a, and that it is decoupled to the set 6d in which the transmission control station is the vehicle monitoring control device 2a and to the set 6e in which the transmission control station is the vehicle monitoring control device 2e.

First, in the set 6f, the vehicle monitoring control device 2a operating as the transmission control station broadcasts the cycle start message 500a (denoted by the black rectangle in FIG. 15) to the vehicle monitoring control devices 2b-2e and relay devices 1a and 1b at the start point of the communication cycle N. Subsequently, the vehicle monitoring control device 2a broadcasts a periodic message 600a containing the monitoring control data on its own vehicle 4a to the vehicle monitoring control devices 2b-2e and relay devices 1a and 1b.

The cycle start message 500a and periodic message 600a broadcast are sent to the vehicle monitoring control devices 2b and 2c via the relay device 1a, and to the vehicle monitoring control devices 2d and 2e via the relay devices 1a and 1b. Receiving the cycle start message 500a, the vehicle monitoring control devices 2b, 2c, 2d and 2e start their timers considering the receiving points of the cycle start message 500a as the start timing of the communication cycles, and measure the time elapsed from the start points of the cycles while timing the aperiodic communication disabled period and aperiodic communication enabled period.

Next, the vehicle monitoring control devices 2b and 2c broadcast the periodic messages 600b and 600c containing the monitoring control data on the vehicles 4b and 4c. In addition, receiving the cycle start message 500a, the vehicle monitoring control devices 2d and 2e broadcast the periodic messages 600d and 600e containing the monitoring control data on the vehicles 4d and 4e.

Thus, the vehicle monitoring control device 2b receives the periodic messages 600a, 600c, 600d and 600e, and the vehicle monitoring control device 2c receives the periodic messages 600a, 600b, 600d and 600e. In addition, the vehicle monitoring control device 2d receives the periodic messages 600a, 600b, 600c and 600e, and the vehicle monitoring control device 2e receives the periodic messages 600a, 600b, 600c and 600d.

When the set 6f is decoupled to the sets 6d and 6e at time T1, the set 6d continues the communication of the communication cycle N in accordance with the cycle start message 500a from the vehicle monitoring control device 2a. On the other hand, as for the set 6e, since the cycle start message 500a does not arrive, it continues the idle state of the previous communication cycle N.

When a fixed time period t0 has elapsed from the start of the communication cycle N, the communication cycle management section 111 of the relay device 1b in the set 6e and the communication cycle management sections 211 of the vehicle monitoring control devices 2d and 2e erase the transmission source identifier (identifier for identifying the vehicle monitoring control device 2a) of the cycle start message stored in the cycle information storage sections 118 and 218. From this point forward, the communication cycle management sections 111 and 211 make a transition to the autonomous mode, and manage the start timing of the communication cycles with their own timers.

After that, assume that at time T6 the vehicle monitoring control device 2e is established as the transmission control station of the set 6e. In this case, the vehicle monitoring control device 2e that becomes the transmission control station manages the start timing of the communication cycle 1 using the timer, and broadcasts a cycle start message 500e (denoted by a white rectangle in FIG. 15) to the vehicle monitoring control device 2d and relay device 1b at the start point of the communication cycle 1.

The cycle start message 500e broadcast is received by the relay device 1b and vehicle monitoring control device 2d at time T7. In this case, the communication cycle management sections 111 and 211 of the relay device 1b and vehicle monitoring control device 2d do not retain the content of the transmission source identifier of the cycle start message in the cycle information storage sections 118 and 218.

Then, the communication cycle management sections 111 and 211 of the relay device 1b and vehicle monitoring control device 2d store the content of the transmission source identifier of the cycle start message 500e into the cycle information storage sections 118 and 218, and start their timers considering the receiving points of the cycle start message 500e as the start timing of the communication cycles. From this point forward, the communication cycle management sections 111 and 211 manage the start timing from the communication cycle 1 forward in accordance with the cycle start message 500e.

As described above, according to the present embodiment 2, the communication cycle management sections 111 and 211 of the relay device 1 and vehicle monitoring control device 2 include the cycle information storage sections 118 and 218 for storing the transmission source identifier indicating the transmission source of the cycle start message; manage the communication cycles in accordance with the cycle information in the cycle start message received from the transmission source of the transmission source identifier stored in the cycle information storage sections 118 and 218; erase the transmission source identifier in the cycle information storage sections 118 and 218 when the information indicating the change of the transmission control station is set in the cycle start message received from the transmission source corresponding to the transmission source identifier stored in the cycle information storage sections 118 and 218 or when the cycle start message is not received for a prescribed time period; and manage the communication cycles in accordance with the existing cycle information until receiving the cycle start message from a new transmission source whose transmission source identifier is to be stored in the cycle information storage sections 118 and 218. The system configured in this way can maintain the real time quality of the periodic message while carrying out the communication of the aperiodic message that does not require real time quality even in the case of coupling or decoupling the sets.

Embodiment 3

The foregoing embodiment 2 is described by way of example in which the initial state following the inter-mode transition is the aperiodic communication disabled state in either the vehicle monitoring control device 2 operating as a transmission control station or in the relay devices 1 and vehicle monitoring control devices 2 which operate as the transmission subsidiary stations. In the present embodiment 3, an example will be described in which the initial state following the inter-mode transition is an idle state.

The train communication system of the embodiment 3 is basically the same as the configuration shown in FIG. 10 of the foregoing embodiment 2. In addition, the configurations of the relay device 1 and vehicle monitoring control device 2 of the train communication system are basically the same as those of FIGS. 4-7 shown in the foregoing embodiment 1. The embodiment 3 differs from the foregoing embodiment 1 and the foregoing embodiment 2 in that the communication cycle management sections 111 and 211 manage the communication cycles by making a transition from the idle state.

Next, the operation will be described.

(1) Operation by Communication Cycle Management Section in Control Station Mode.

Figure 16:
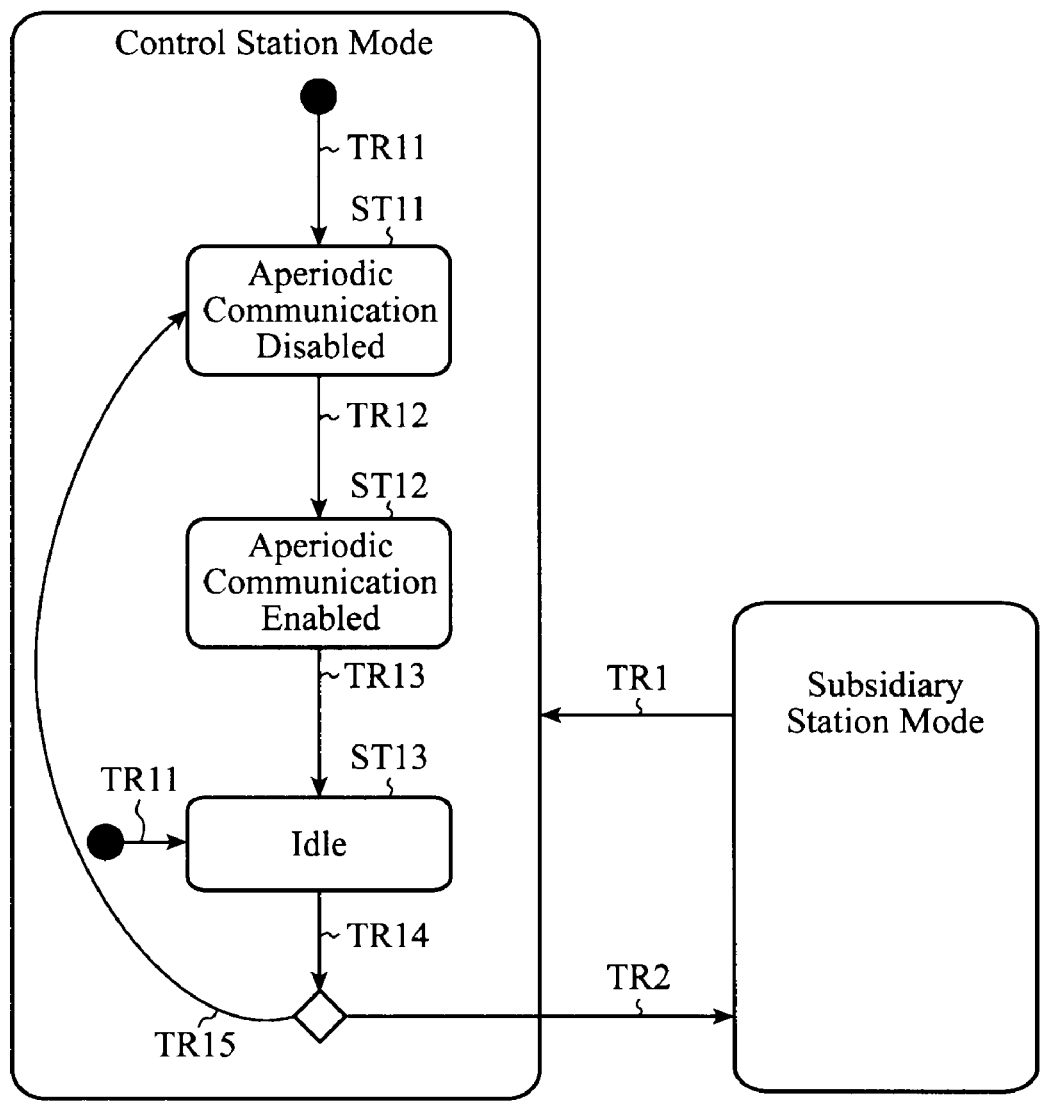
FIG. 16 is a diagram showing communication state transition of a communication cycle management section of a vehicle monitoring control device which is a transmission control station in a train communication system of an embodiment 3 in accordance with the present invention.

FIG. 16 is a diagram showing the communication state transition of the communication cycle management section of the vehicle monitoring control device operating as the transmission control station in the train communication system of the embodiment 3. Incidentally, the configurations of the vehicle monitoring control devices 2a-2e of the embodiment 3 are basically the same as those shown in FIGS. 4-7 described in the foregoing embodiment 1.

In the following, the operation of the communication cycle management section 211 of the vehicle monitoring control device 2 operating as the transmission control station will be described in detail with reference to FIG. 16 and FIGS. 6 and 7 shown in the foregoing embodiment 1. In addition, it is assumed in FIG. 16 that the communication cycle management section 211 of the vehicle monitoring control device 2 operating as the transmission control station is in a control station mode as its operation mode, and that the communication cycle management sections 111 and 211 of the relay devices 1 and vehicle monitoring control devices 2 which operate as the transmission subsidiary stations are in a subsidiary station mode as their operation mode.

First, the communication cycle management section 211 in the control station mode starts the timer at the start point of the communication cycle, and broadcasts, without setting the transmission control station change flag, the cycle start message to the communication cycle management sections 211 in the subsidiary station mode via the transmission message selecting section 215 and intra-set transmission line interface 28. This will shift the communication cycle management section 211 in the control station mode to an idle state ST13 (transition TR11).

In the stage (transition TR14) in which the idle period (fixed time period) based on the contents of the cycle information has elapsed from the start of the communication cycle, the communication cycle management section 211 in the control station mode broadcasts, if the control station mode is maintained, the cycle start message about the next communication cycle to the communication cycle management sections 211 in the subsidiary station mode via the transmission message selecting section 215 and intra-set transmission line interface 28 without setting the transmission control station change flag. After that, the communication cycle management section 211 in the control station mode shifts the communication cycle from the idle state ST13 to the aperiodic communication disabled state ST11 (transition TR15).

When the aperiodic communication disabled period (fixed time period) has elapsed, the communication cycle management section 211 makes a transition from the aperiodic communication disabled state ST11 to the aperiodic communication enabled state ST12 (transition TR12). In addition, when the aperiodic communication enabled period (fixed time period) has elapsed, the communication cycle management section 211 makes a transition from the aperiodic communication enabled state ST12 to the idle state ST13 (transition TR13).

On the other hand, before the idle period has elapsed, if the communication cycle management section 211 in the control station mode is to be shifted to the transmission subsidiary station with the coupling or decoupling of the sets, it sets the transmission control station change flag to the cycle information in the cycle start message about the next communication cycle.

After that, the communication cycle management section 211 in the control station mode broadcasts the cycle start message to which the transmission control station change flag is set to the communication cycle management sections 111 and 211 in the subsidiary station mode via the transmission message selecting section 215 and intra-set transmission line interface 28. Thus, the vehicle monitoring control device 2 operating as the transmission control station shifts to the transmission subsidiary station (subsidiary station mode) (transition TR2).

(2) Operation by Communication Cycle Management Section in Subsidiary Station Mode.

Figure 17:
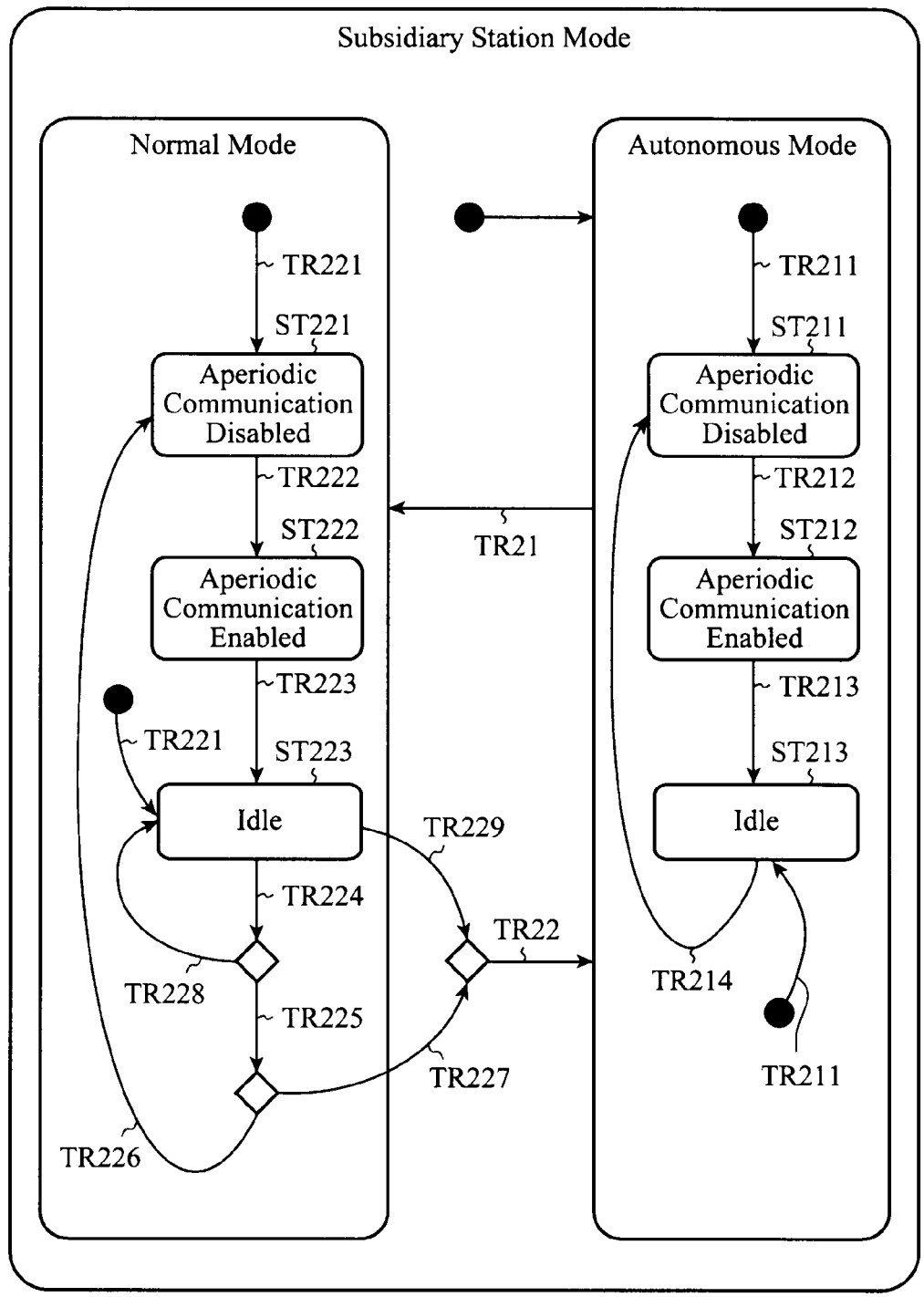
FIG. 17 is a diagram showing communication state transition of a communication cycle management section of a vehicle monitoring control device which is a transmission subsidiary station in the train communication system of the embodiment 3.

FIG. 17 is a diagram showing the communication state transition of the communication cycle management sections of the vehicle monitoring control devices and relay devices which operate as the transmission subsidiary stations in the train communication system of the embodiment 3. Incidentally, the configurations of the relay devices 1a and 1b and vehicle monitoring control devices 2a-2e of the embodiment 3 are basically the same as those of FIGS. 4-7 shown in the foregoing embodiment 1. Incidentally, the subsidiary station mode has a normal mode that manages the communication cycles in accordance with the cycle start message from the transmission control station, and an autonomous mode that manages the communication cycles in accordance with its own timer.

The communication cycle management sections 111 and 211 in the subsidiary station mode enter into the autonomous mode immediately after the start (transition TR211), and start their timers. At the same time, the communication cycle management sections 111 and 211 in the subsidiary station mode start the idle period based on the contents of the cycle information stored in advance, thereby entering into the idle state ST213.

The communication cycle management sections 111 and 211 in the autonomous mode start the communication cycle, and make a transition from the idle state ST213 to the aperiodic communication disabled state ST211 when the idle period (fixed time period) based on the contents of the cycle information has elapsed (transition TR214). In addition, when the aperiodic communication disabled period (fixed time period) has elapsed, the communication cycle management sections 111 and 211 make a transition from the aperiodic communication disabled state ST211 to the aperiodic communication enabled state ST212 (transition TR212). Subsequently, when the aperiodic communication enabled period (fixed time period) has elapsed, the communication cycle management sections 111 and 211 in the autonomous mode shift to the idle state ST213 (transition TR213).

In the autonomous mode, the storage content of the transmission source identifier of the cycle start message is vacant. Receiving the cycle start message in the autonomous mode, the communication cycle management sections 111 and 211 store into the cycle information storage sections 118 and 218 the transmission source identifier in the cycle start message, and make a transition to the normal mode (transition TR21).

The communication cycle management sections 111 and 211 in the normal mode start their timers at the receiving points of the cycle start message. Thus, the communication cycle management sections 111 and 211 in the normal mode start the idle period based on the contents of the cycle information in the cycle start message, and enter into the idle state ST223 (transition TR221).

When not receiving any cycle start message for a certain time period in the idle state ST223 (transition TR229), the communication cycle management sections 111 and 211 erase the content of the transmission source identifier stored in the cycle information storage sections 118 and 218, and make a transition to the autonomous mode (transition TR22).

On the other hand, when receiving the cycle start message in the idle state ST223 (transition TR224), the communication cycle management sections 111 and 211 compare the content of the transmission source identifier of the received cycle start message with the content of the transmission source identifier read out of the cycle information storage sections 118 and 218. Unless the contents of the two transmission source identifiers agree, the communication cycle management sections 111 and 211 make a transition to the idle state ST223 (transition TR228).

In contrast, when the contents of the two transmission source identifiers agree (transition TR225), the communication cycle management sections 111 and 211 erase, if the transmission control station change flag of the cycle start message has been set (transition TR227), the content of the transmission source identifier stored in the cycle information storage sections 118 and 218 and make a transition to the autonomous mode (transition TR22).

Unless the transmission control station change flag of the cycle start message has been set in the transition TR225, the communication cycle management sections 111 and 211 consider it as the cycle start message about the next communication cycle from the vehicle monitoring control device 2 operating as the transmission control station, reset the timer, and make a transition to the aperiodic communication disabled state ST221 (transition TR226).

When the aperiodic communication disabled period (fixed time period) based on the contents of the cycle information has elapsed from the start of the communication cycle, the communication cycle management sections 111 and 211 in the normal mode make a transition from the aperiodic communication disabled state ST221 to the aperiodic communication enabled state ST222 (transition TR222). In addition, when the aperiodic communication enabled period (fixed time period) has elapsed, the communication cycle management sections 111 and 211 make a transition from the aperiodic communication enabled state ST222 to the idle state ST223 (transition TR223).

(3) Operation at Decoupling of Sets.

Figure 18:
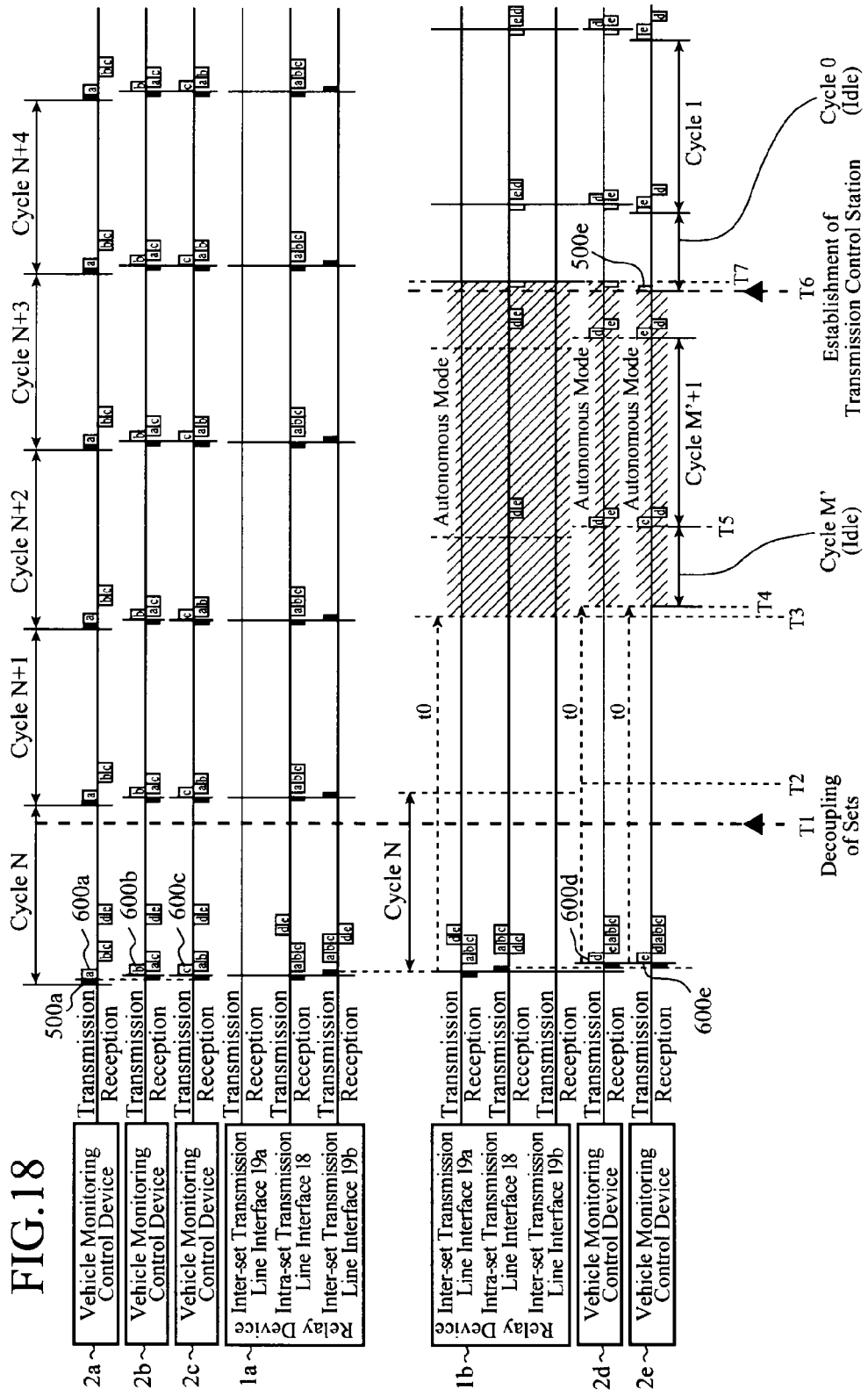
FIG. 18 is a timing chart showing a flow of the operation at a decoupling of sets in the train communication system of the embodiment 3.

FIG. 18 is a timing chart showing a flow of the operation at the decoupling of the sets in the train communication system of the embodiment 3, in which the set 6f is separated to the sets 6d and 6e. It is assumed here that the transmission control station in the set 6f is the vehicle monitoring control device 2a, and that it is decoupled to the set 6d in which the transmission control station is the vehicle monitoring control device 2a and to the set 6e in which the transmission control station is the vehicle monitoring control device 2e.

First, in the set 6f, the vehicle monitoring control device 2a operating as the transmission control station broadcasts the cycle start message 500a (denoted by the black rectangle in FIG. 18) to the vehicle monitoring control devices 2b-2e and relay devices 1a and 1b at the start point of the communication cycle N. Subsequently, the vehicle monitoring control device 2a broadcasts a periodic message 600a containing the monitoring control data on its own vehicle 4a to the vehicle monitoring control devices 2b-2e and relay devices 1a and 1b.

The cycle start message 500a and periodic message 600a broadcast are sent to the vehicle monitoring control devices 2b and 2c via the relay device 1a, and to the vehicle monitoring control devices 2d and 2e via the relay devices 1a and 1b. Receiving the cycle start message 500a, the vehicle monitoring control devices 2b, 2c, 2d and 2e start their timers considering the receiving points of the cycle start message 500a as the start timing of the communication cycles, and measure the time elapsed from the start points of the cycles while timing the aperiodic communication disabled period and aperiodic communication enabled period.

Next, the vehicle monitoring control devices 2b and 2c broadcast the periodic messages 600b and 600c containing the monitoring control data on the vehicles 4b and 4c. In addition, receiving the cycle start message 500a, the vehicle monitoring control devices 2d and 2e broadcast the periodic messages 600d and 600e containing the monitoring control data on the vehicles 4d and 4e.

Thus, the vehicle monitoring control device 2b receives the periodic messages 600a, 600c, 600d and 600e, and the vehicle monitoring control device 2c receives the periodic messages 600a, 600b, 600d and 600e. In addition, the vehicle monitoring control device 2d receives the periodic messages 600a, 600b, 600c and 600e, and the vehicle monitoring control device 2e receives the periodic messages 600a, 600b, 600c and 600d.

When the set 6f is decoupled to the sets 6d and 6e at time T1, the set 6d continues the communication of the communication cycle N in accordance with the cycle start message 500a from the vehicle monitoring control device 2a. On the other hand, as for the set 6e, since the cycle start message 500a does not arrive, it continues the idle state of the previous communication cycle N.

When a fixed time period to has elapsed from the start of the communication cycle N, the communication cycle management section 111 of the relay device 1b in the set 6e and the communication cycle management sections 211 of the vehicle monitoring control devices 2d and 2e erase the transmission source identifier (identifier for identifying the vehicle monitoring control device 2a) of the cycle start message stored in the cycle information storage sections 118 and 218. From this point forward, the communication cycle management sections 111 and 211 make a transition to the autonomous mode, and manage the start timing of the communication cycles with their own timers.

After that, assume that at time T6 the vehicle monitoring control device 2e is established as the transmission control station of the set 6e. In this case, the vehicle monitoring control device 2e that becomes the transmission control station manages the start timing of the communication cycle 0 using the timer, and broadcasts a cycle start message 500e (denoted by a white rectangle in FIG. 18) to the vehicle monitoring control device 2d and relay device 1b at the start point of the communication cycle 0. Thus, the vehicle monitoring control device 2e starts the communication cycle 0, and makes a transition to the idle state.

In this way, by setting the initial state after the inter-mode transition to the idle state, at time T6 after the set 6f is decoupled to the sets 6d and 6e as shown in FIG. 18, the communication cycle 0 can be set to the idle period immediately after the vehicle monitoring control device 2e is established as the new transmission control station.

The cycle start message 500e broadcast is received by the relay device 1b and vehicle monitoring control device 2d at time T7. In this case, the communication cycle management sections 111 and 211 of the relay device 1b and vehicle monitoring control device 2d do not retain the content of the transmission source identifier of the cycle start message in the cycle information storage sections 118 and 218.

Then, the communication cycle management sections 111 and 211 of the relay device 1b and vehicle monitoring control device 2d store the content of the transmission source identifier of the cycle start message 500e into the cycle information storage sections 118 and 218, and start their timers considering the receiving points of the cycle start message 500e as the start timing of the communication cycles. Thus, the communication cycle management sections 111 and 211 carry out the communication of the communication cycle 0 (idle state) in accordance with the cycle start message 500e. After the completion of the communication cycle 0, the communication cycle management sections 111 and 211 manage the start timing from the communication cycle 1 forward in accordance with the cycle start message 500e from the vehicle monitoring control device 2e.

As described above, according to the present embodiment 3, since it sets the idle period, which enables communication of only the cycle start message and a message in the middle of communication, to the initial state after the inter-mode transition, it can prevent the cycle start message immediately after the establishment of the transmission control station from being delayed by a message in the course of transmission at the establishment of the transmission control station. Accordingly, it can shift to the stationary state immediately after the idle period after the establishment of the transmission control station.

Incidentally, although the foregoing embodiment 3 is described by way of example in which the initial state following the inter-mode transition is the idle period that enables communication of only the cycle start message and the message in the middle of communication, it is also possible to set the initial state of the communication cycle to the idle state. In this way, the same advantage as described above can be achieved.

Embodiment 4

Figures 19, 20:
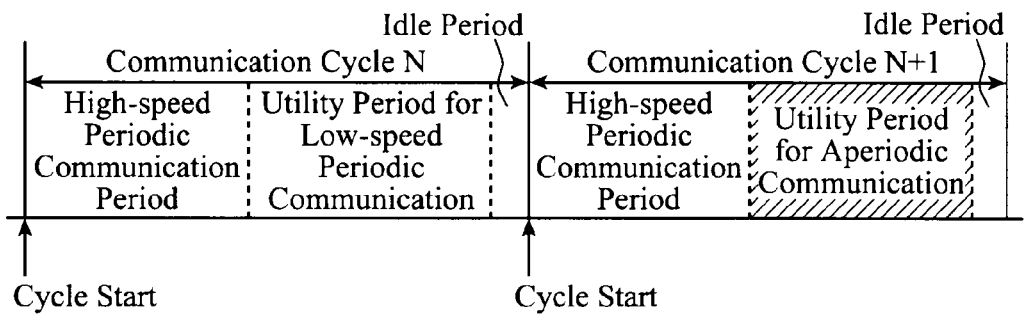
FIG. 19 is a diagram showing communication cycles in a train communication system of an embodiment 4 in accordance with the present invention.
FIG. 20 is a diagram showing a structure of a cycle start message in the embodiment 4.

FIG. 19 is a diagram showing communication cycles in the train communication system of an embodiment 4 in accordance with the present invention. The communication cycle is a unit of a communication pattern carried out repeatedly in the communication via an on-vehicle network. In FIG. 19, in the communication cycle are specified a high-speed periodic communication period, a utility period, and an idle period.

In the high-speed periodic communication period, a prescribed periodic message is transmitted and received in each communication cycle. In the utility period, low-speed periodic communication is carried out in the communication cycle N, and aperiodic communication is carried out in the communication cycle N+1. Incidentally, as for a message type, communication period and the length of the period to be communicated in the utility period, they are set by the communication cycle management section 211 of the vehicle monitoring control device 2 operating as a transmission control station. In other words, in the embodiment 4, in the utility period of the communication cycle, the communication cycle management section 211 of the vehicle monitoring control device 2 operating as the transmission control station can designate the transmission of a message with a different type in each communication cycle.

FIG. 20 is a diagram showing a structure of the cycle start message in the embodiment 4. As shown in FIG. 20, the cycle start message of the embodiment 4 consists of the fields corresponding to the message identifier, transmission source identifier, transmission control station change flag, cycle length, high-speed periodic communication duration, utility period application and utility period duration, respectively.

In the utility period application field, information indicating the application of the utility period in the communication cycle is stored. In the example of FIG. 19, information indicating low-speed periodic communication is stored in the utility period application field of the cycle start message in the communication cycle N. In addition, information indicating aperiodic communication is stored in the utility period application field of the cycle start message in the communication cycle N+1.

The information such as the transmission source identifier, transmission control station change flag, cycle length, high-speed periodic communication duration, application of the utility period and duration of the utility period, which are stored in the individual fields of the cycle start message, is referred to as cycle information collectively. The relay devices 1 and vehicle monitoring control devices 2 carryout communication via the on-vehicle network in accordance with the cycle information read out of the cycle start message.

As described above, according to the present embodiment 4, it employs the cycle information for specifying the utility period, to which the type, communication period and duration of the message to be communicated are set by the communication cycle management section 211 of the vehicle monitoring control device 2 operating as the transmission control station, as the period that classifies the communication cycle. This makes it possible to transmit a message of different types in each communication cycle, and to carry out communication in different periods for different types of data as to the data to be communicated periodically. In addition, as to the data to be subjected to the aperiodic communication, a communication band can be assigned to each data type.

Incidentally, the foregoing embodiment 4 is applicable to the foregoing embodiments 1-3 and to the following embodiment 5.

Embodiment 5

Figure 21:
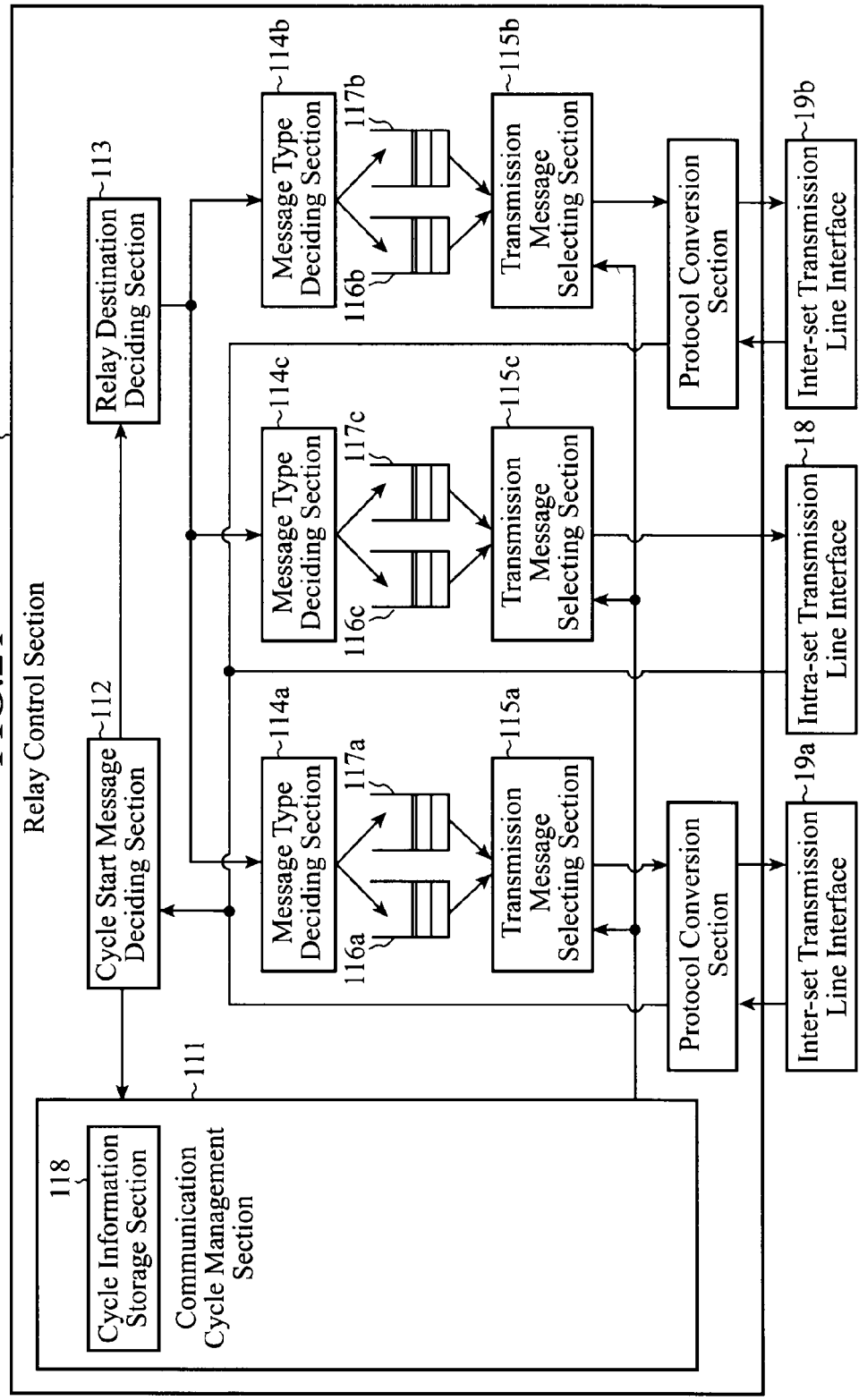
FIG. 21 is a block diagram showing a configuration of a relay control section of a relay device of an embodiment 5 in accordance with the present invention.

FIG. 21 is a block diagram showing a configuration of the relay control section of the relay device of the embodiment 5 in accordance with the present invention. In FIG. 21, the relay control section 11 of the embodiment 5 has, in addition to the configuration as shown in FIG. 5, protocol conversion sections 119a and 119b. The protocol conversion sections 119a and 119b convert the protocols of the message transmitted and received via the inter-set transmission line interfaces 19a and 19b.

For example, within the sets, to achieve high-speed communication, the data link layer or lower layer on the intra-set transmission lines 8 employs Ethernet (registered trademark). In addition, to maintain the reliability for connection and disconnection by the automatic couplers between the sets, the data link layer on the inter-set transmission lines 9 employs HDLC (High-level Data Link Control Procedure), and the physical layer employs RS-422 (Recommended Standard 422), which is a physical layer interface standard of serial transfer.

In this case, the intra-set transmission line interface 18 operates as an Ethernet (registered trademark) interface, and the inter-set transmission line interfaces 19a and 19b become an HDLC/RS-422 interface. The protocol conversion sections 119a and 119b carry out protocol conversion of the message received via the inter-set transmission line interfaces 19a and 19b to an Ethernet (registered trademark) frame. Thus, the individual components of the relay control section 11 handle the message in the Ethernet (registered trademark) frame.

The protocol conversion sections 119a and 119b carry out protocol conversion of the message to be transmitted via the inter-set transmission line interfaces 19a and 19b from the Ethernet (registered trademark) frame to an HDLC frame. Thus, on the inter-set transmission lines 9a and 9b connected to the inter-set transmission line interfaces 19a and 19b, messages of the HDLC frame are handled.

As described above, according to the present embodiment 5, it sets different communication protocols to the intra-set transmission lines 8 that connect between the relay device 1 in the set and the vehicle monitoring control devices 2 and to the inter-set transmission lines 9 that connect between the relay devices 1, and includes the protocol conversion sections 119a and 119b for converting to the communication protocols corresponding to the individual transmission lines 8 and 9 when the relay devices 1 relay the communication between the intra-set transmission lines 8 and the inter-set transmission lines 9. This makes it possible to use different protocols for the data link layer and lower layers of the intra-set transmission lines 8 and inter-set transmission lines 9. For example, it is possible to use a high-speed protocol within the sets, and to use between the sets a low-speed protocol capable of maintaining the reliability for the connection and disconnection by the automatic couplers.

Incidentally, the foregoing embodiment 5 is applicable to the foregoing embodiments 1-4.

Figure 22:
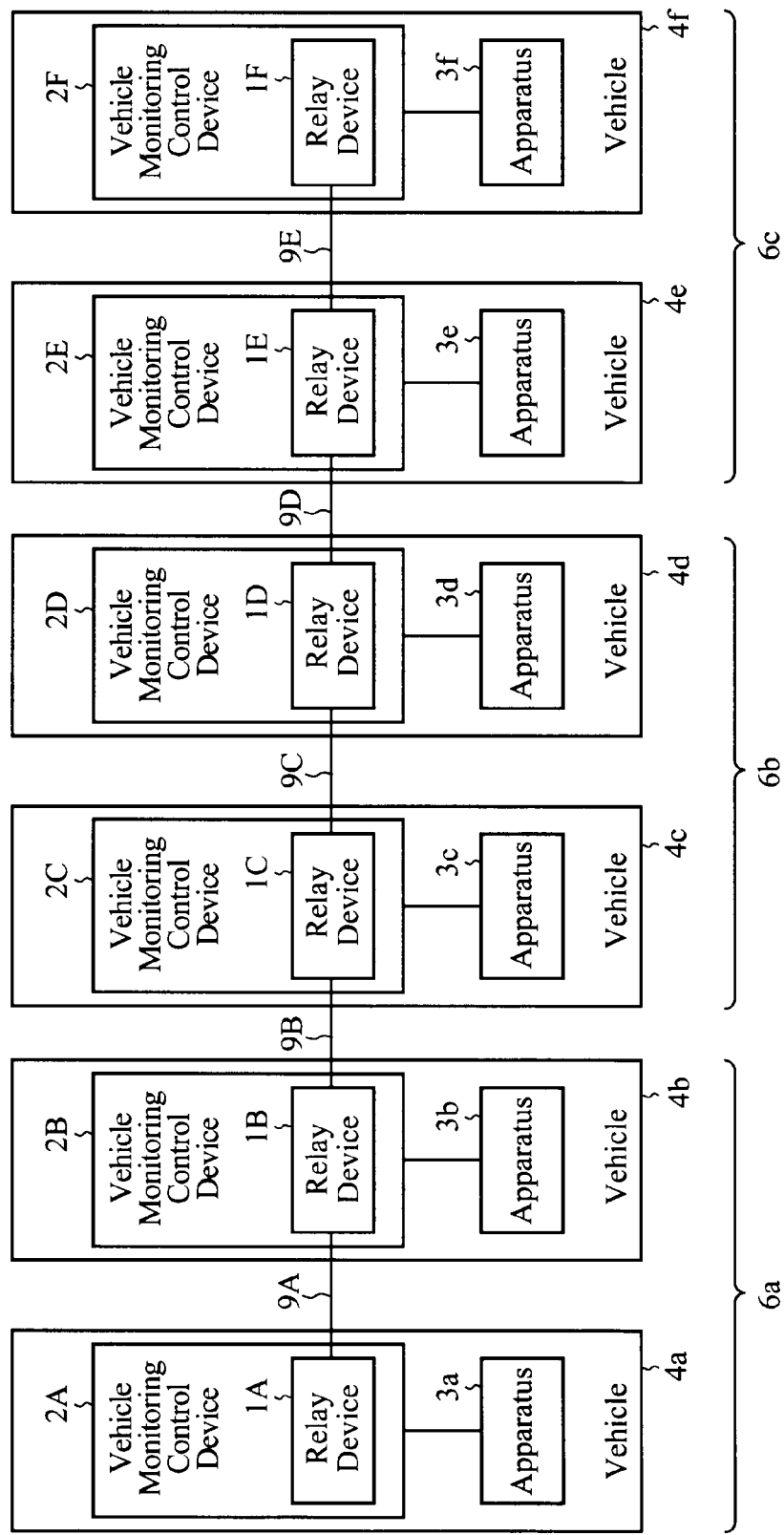
FIG. 22 is a block diagram showing another configuration of a train communication system in accordance with the present invention.

In addition, although the configurations are shown in which the relay devices 1 are installed separately from the vehicle monitoring control devices 2 in the foregoing embodiments 1-5, a component with the same function as the relay device 1 can be provided in the vehicle monitoring control device 2. FIG. 22 is a block diagram showing another configuration of the train communication system in accordance with the present invention. In FIG. 22, vehicle monitoring control devices 2A-2F include relay processing units 1A-1F with the same functions as the relay device 1 shown in the foregoing embodiments 1-5.

The relay processing units 1A and 1B are connected via a transmission line 9A in the set 6a. Likewise, the relay processing units 1C and 1D are connected via a transmission line 9C in the set 6b. The relay processing units 1E and 1F are connected via a transmission line 9E in the set 6c. Furthermore, the relay processing units 1B and 1C are interconnected via a transmission line 9B, and the relay processing units 1D and 1E are interconnected via a transmission line 9D.

In the train communication system shown in FIG. 22, an on-vehicle network is constructed which carries out information transmission via the transmission lines 9A-9E. For example, the vehicle monitoring control devices 2A and 2B carry out communication within the set 6a via the relay processing units 1A and 1B using the transmission line 9A as the intra-set transmission line, and carry out communication with the vehicle monitoring control device 2C using the transmission line 9B as the inter-set transmission line. In this way, the relay processing units 1A-1F shown in FIG. 22 perform the processing shown in the foregoing embodiments 1-5 as functional components of the vehicle monitoring control devices 2A-2F. The configuration formed in this way can achieve the same advantages as described above.

INDUSTRIAL APPLICABILITY

The train communication system in accordance with the present invention can eliminate the conditions in which the message enabled to carry out the aperiodic communication can impair the real time quality of the message to be communicated periodically. Accordingly, it can achieve sophisticated running control and fault diagnostic functions in the communication via the on-vehicle network.

What is claimed is:

1. A train communication system having a communication device mounted on each vehicle of a train, the communication device comprising:
a cycle information storage section configured to store cycle information indicating that a communication cycle is divided into a first period, a second period and a idle period, the first period enabling communication of only a message to be communicated periodically, the second period enabling communication of a message allowing non-periodic communication, and the idle period enabling communication of only a cycle start message and a message in course of communication;
a cycle management section configured to control a start timing of a communication cycle, and to allocate three types of periods to the communication cycle after the start timing by shifting the first period, the second period and the idle period in accordance with the cycle information stored by the cycle information storage section;
a queue section configured to store messages received by the communication device; and
a message selecting section configured to select a message corresponding to the period allocated by the cycle management section of the communication device from the queue section, and to transmit the selected message.

2. The train communication system according to claim 1, wherein
duration of the idle period is a longest time period taken to perform message transmission between the communication devices.

3. The train communication system according to claim 1, further comprising a relay device mounted on at least one vehicle included in each set of vehicles of the train, and configured to relay communication between the communication devices, wherein the relay device has:
a cycle information storage section configured to store the cycle information;
a cycle management section configured to allocate three types of periods to the communication cycle after the start timing controlled by the communication device by shifting the first period, the second period and the idle period in accordance with the cycle information stored by the cycle information storage section of the relay device;
a queue section configured to store messages received by the relay device; and
a message selecting section configured to acquire a message corresponding to the period allocated by the cycle management section of the relay device from the queue section, and to transmit the acquired message,
wherein duration of the idle period is a time period longer than a longer one of a time period taken to transmit a message between the adjacent relay devices and a time period taken to transmit a message between the relay devices and the communication devices connected directly.

4. The train communication system according to claim 1, wherein
the communication device operates as a transmission control station or a transmission subsidiary station, and
the cycle management section,
when operating as the transmission control station, transmits a cycle start message containing the cycle information to the communication devices operating as transmission subsidiary stations at start points of the communication cycles, and carries out communication in the communication cycles in accordance with time elapsed measured from the start points of the communication cycles, and
when operating as the transmission subsidiary stations, starts, at receiving points of the cycle start message, communication in the communication cycles conforming to the cycle information in the cycle start message, and carry out communication in the communication cycles in accordance with time elapsed measured from the receiving points of the cycle start message.

5. The train communication system according to claim 3, further comprising
a plurality of intra-set transmission lines for connecting the relay device and the communication devices within each set of the train, and
a plurality of inter-set transmission lines for connecting the relay devices, wherein
the relay devices have a protocol conversion section for converting to a communication protocol corresponding to each transmission line when relaying communication between the intra-set transmission lines of a set of vehicles of the train and the intra-set transmission lines of another set of vehicles of the train.

6. The train communication system according to claim 3, wherein
the communication device operates as the transmission control station or a transmission subsidiary station,
the cycle management section of the communication device,
when operating as the transmission control station, transmits, at the start points of the communication cycles, the cycle start message containing the cycle information to the relay devices and the communication devices, which operate as the transmission subsidiary stations, and carries out communication in the communication cycles in accordance with the time elapsed measured from the start points of the communication cycles, and
when operating as the transmission subsidiary stations starts, at the receiving points of the cycle start message, the communication in the communication cycles conforming the cycle information in the cycle start message, and carry out communication in the communication cycles in accordance with the time elapsed measured from the receiving points of the cycle start message, and
the cycle management section of the relay device starts, at the receiving points of the cycle start message, the communication in the communication cycles conforming the cycle information in the cycle start message, and carries out communication in the communication cycles in accordance with the time elapsed measured from the receiving points of the cycle start message.

7. The train communication system according to claim 3, wherein
each of the cycle management sections of the communication devices and the relay devices allocates the idle period to a beginning of the communication cycles.

8. The train communication system according to claim 3, wherein
each of the cycle management sections of the communication devices and the relay devices allocates the idle period immediately after a mode transition that is made to one of a transmission control station mode operating as a transmission control station, a normal mode operating as a transmission subsidiary station in the communication cycles conforming to the cycle information in the cycle start message, and an autonomous mode operating as a transmission subsidiary station in the communication cycles conforming to the cycle information stored in their own devices.

9. The train communication system according to claim 4, wherein
the cycle information storage section stores a transmission source identifier indicating a transmission source of the cycle start message, and
the cycle management section
allocates the three types of periods to the communication cycles in accordance with the cycle information in the cycle start message received from the transmission source of the transmission source identifier stored in the storage section, and
when information indicating a change of the transmission control station is set in the cycle start message received from the transmission source of the transmission source identifier stored in the storage section, or when the cycle start message is not received for a prescribed time period, erases the transmission source identifier in the cycle information storage section, and allocates the three types of periods to the communication cycles in accordance with the cycle information stored in its own device in advance until receiving a cycle start message from a new transmission source whose transmission source identifier is to be stored in the cycle information storage section.

10. The train communication system according to claim 4, wherein
the cycle management section of the communication device, when operating as the transmission control station, specifies a period, to which a type, communication period, and duration of a message to be communicated are set, as a period for classifying the communication cycles.

11. A communication device mounted on each vehicle of a train, comprising:
a cycle information storage section configured to store cycle information indicating that a communication cycle is divided into a first period, a second period and a idle period, the first period enabling communication of only a message to be communicated periodically, the second period enabling communication of a message allowing non-periodic communication, and the idle period enabling communication of only a cycle start message and a message in course of communication;
a cycle management section configured to control a start timing of a communication cycle, and to allocate three types of periods to the communication cycle after the start timing by shifting the first period, the second period and the idle period in accordance with the cycle information stored by the cycle information storage section;
a queue section configured to store messages received by the communication; and
a message selecting section configured to select a message corresponding to the period allocated by the cycle management section of the communication device from the queue section, and to transmit the selected message.

12. A relay device mounted on at least one vehicle included in each set of vehicles of a train, each set having plural communication devices, and configured to relay communication between the communication devices as defined in claim 1, the relay device comprising:
a cycle information storage section configured to store the cycle information;
a cycle management section configured to allocate three types of periods to the communication cycle after the start timing controlled by the communication device by shifting the first period, the second period and the idle period in accordance with the cycle information stored by the cycle information storage section of the relay device;
a queue section configured to store messages received by the relay device; and
a message selecting section configured to acquire a message corresponding to the period allocated by the cycle management section of the relay device from the queue section, and to transmit the acquired message.

* * * * *